United States Patent
Bingham et al.

(10) Patent No.: US 12,079,313 B2
(45) Date of Patent: Sep. 3, 2024

(54) SOFTWARE LICENSING MANAGEMENT AND AUTHENTICATION

(71) Applicant: AGILENT TECHNOLOGIES, INC., Santa Clara, CA (US)

(72) Inventors: Dustin Bingham, Santa Clara, CA (US); Charles Manfredi, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 87 days.

(21) Appl. No.: 17/612,911

(22) PCT Filed: May 21, 2020

(86) PCT No.: PCT/US2020/034032
§ 371 (c)(1),
(2) Date: Nov. 19, 2021

(87) PCT Pub. No.: WO2020/237070
PCT Pub. Date: Nov. 26, 2020

(65) Prior Publication Data
US 2022/0318345 A1    Oct. 6, 2022

Related U.S. Application Data

(60) Provisional application No. 62/850,974, filed on May 21, 2019.

(51) Int. Cl.
G06F 21/10       (2013.01)
H04L 67/141      (2022.01)

(52) U.S. Cl.
CPC ........ *G06F 21/105* (2013.01); *G06F 21/1077* (2023.08); *H04L 67/141* (2013.01)

(58) Field of Classification Search
CPC .......... G06F 21/105; G06F 2221/0773; G06F 2221/0771; G06F 21/10; G06F 21/121; H04L 67/141
See application file for complete search history.

(56) References Cited

U.S. PATENT DOCUMENTS

| 6,564,323 B2 | 5/2003 | Takahashi et al. |
| 2001/0011254 A1* | 8/2001 | Clark .................... G06F 21/125 705/59 |

(Continued)

OTHER PUBLICATIONS

International Search Report and Written Opinion issued in PCT/US2020/034032 dated Jul. 30, 2020 (8 pages).

*Primary Examiner* — Dao Q Ho

(57) ABSTRACT

Novel tools and techniques are provided for implementing software licensing management and authentication. In various examples, a computing system might receive a request for an unlock code for a requested service from a user using a client device on which a first software is executed, the request comprising a generated unique identifier associated with the requested service and/or the first software. The generated unique identifier comprises licensing information associated with the requested service and/or the first software. In response to receiving the generated unique identifier, the computing system might determine whether the user should have access to the requested service using the first software based at least in part on the licensing information. If so, the computing system might generate an unlock code associated with the requested service using the first software, might deduct cost associated with the licensing information, and might send the unlock code to the user.

13 Claims, 17 Drawing Sheets

(56) References Cited

U.S. PATENT DOCUMENTS

| | | | |
|---|---|---|---|
| 2006/0048132 A1* | 3/2006 | Chen | G06F 21/10 |
| | | | 717/168 |
| 2006/0059571 A1* | 3/2006 | Chen | G06F 21/10 |
| | | | 726/29 |
| 2006/0064313 A1* | 3/2006 | Steinbarth | G06Q 10/1057 |
| | | | 705/322 |
| 2014/0375422 A1* | 12/2014 | Huber | G07C 9/00571 |
| | | | 340/5.61 |
| 2017/0085546 A1* | 3/2017 | Velusamy | H04W 12/35 |
| 2021/0288827 A1* | 9/2021 | Celozzi | H04M 15/00 |
| 2022/0318345 A1* | 10/2022 | Bingham | H04L 9/0643 |

* cited by examiner

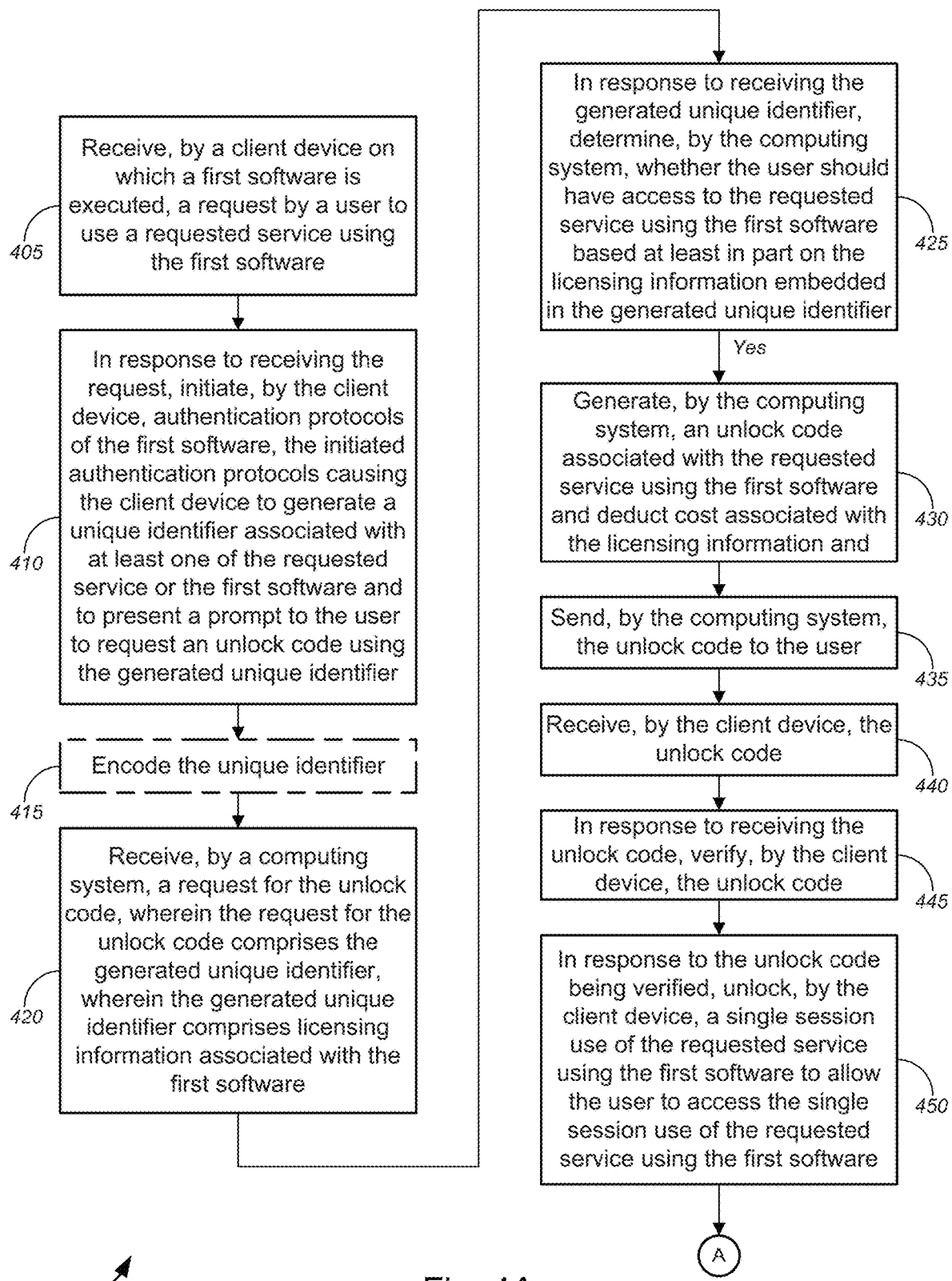

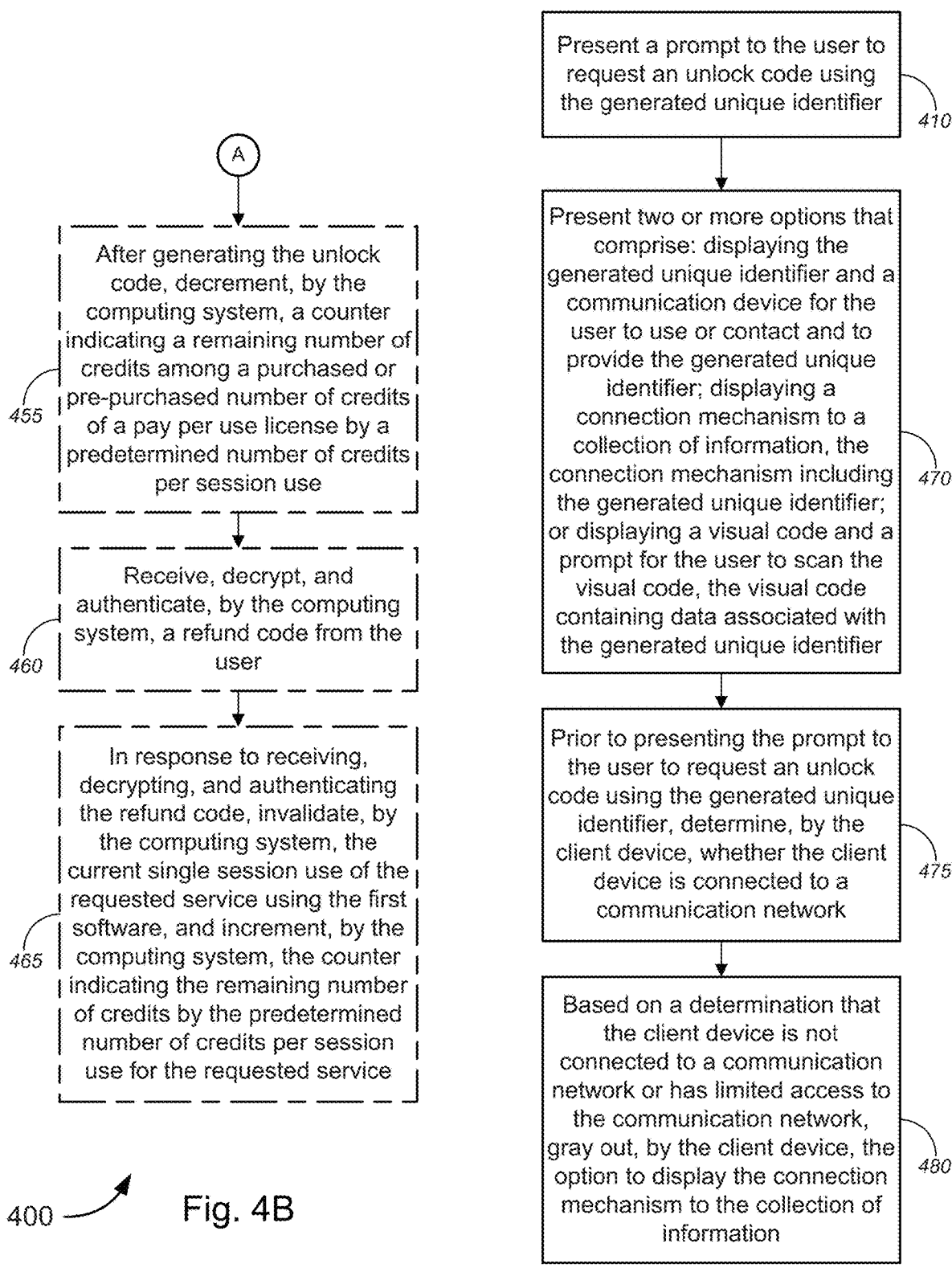

SOFTWARE LICENSING MANAGEMENT AND AUTHENTICATION

CROSS-REFERENCES TO RELATED APPLICATIONS

This application claims priority under 35 U.S.C. § 371 to PCT Application PCT/US2020/034032 filed on May 21, 2020 which claims priority to U.S. Patent Application Ser. No. 62/850,974 (the "'974 Application"), filed May 21, 2019 by Dustin Bingham et al., entitled, "Method and System for Implementing Software Licensing Management and Authentication," the disclosures of which are incorporated herein by reference in their entireties for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing software licensing management and authentication, and, more particularly, to methods, systems, and apparatuses for implementing software licensing management and authentication regardless of whether a client device associated with a potential licensee is connected via a communication network, such as the Internet.

BACKGROUND

Conventional licensing management and authentication techniques and systems, such as those utilizing the pay per use model of software licensing, for example, allow for flexible consumption of services that users or customers use. Such conventional techniques and systems, however, also introduce a problem of management for the provider of the licenses. In particular, the conventional approaches either expose a vulnerability for bypassing the license enforcement mechanism, use an external piece of hardware (e.g., a dongle, or the like), or force the user to maintain an Internet connection. In some cases, some customers may have the requirement that no software in their lab or laboratory may be connected to the Internet, which would force those customers or the service provider to choose among the licensing solutions that have been known to allow an attack surface for license cheating.

Prior solutions fell into four broad categories: (i) Local license server; (ii) File-based licensing; (iii) Hardware-based license; and (iv) Internet-based licensing (or phone-home licensing). Under (i) the local license server model, the end-user installs a local license server to administer licensing. Because the server is installed locally, it is vulnerable to exploitation by nefarious users. A similar model to that of the local license server, (ii) the file-based licensing approach requires an individual piece of software to administer usage, where the record of usage is maintained on a local file, which exposes the same attack surfaces as the local license server. (iii) The hardware-based license model uses an external piece of hardware (e.g., a dongle, or the like) that connects to the machine running the software. While more robust than the two approaches discussed above, many customers are not enthusiastic about attaching an outside sourced piece of hardware to their equipment to run software. Also, nefarious users have been known to "ghost" or "suck" data off the dongle (which represents exposing another attack surface). Under (iv) the Internet-based licensing model, all administration is performed by the licensor. While individual software installations communicating to the licensor's license server to perform license administration tasks avoids the potential risks of problems highlighted with respect to (i) and (ii) above, it may not be permissible due to the customer's Internet policies. This model is also problematic especially for those highly sensitive laboratories where business critical products are developed, and the customer will not permit any software to have access to the outside Internet.

Hence, there is a need for more robust and scalable solutions for implementing software licensing management and authentication, and, more particularly, to methods, systems, and apparatuses for implementing software licensing management and authentication regardless of whether a client device associated with a potential licensee is connected with a communication network (e.g., the Internet or other network).

BRIEF DESCRIPTION OF THE DRAWINGS

A further understanding of the nature and advantages of particular examples may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4D are flow diagrams illustrating a method for implementing software licensing management and authentication, in accordance with various examples.

DETAILED DESCRIPTION OF CERTAIN EXAMPLES

Overview

Figure 1:
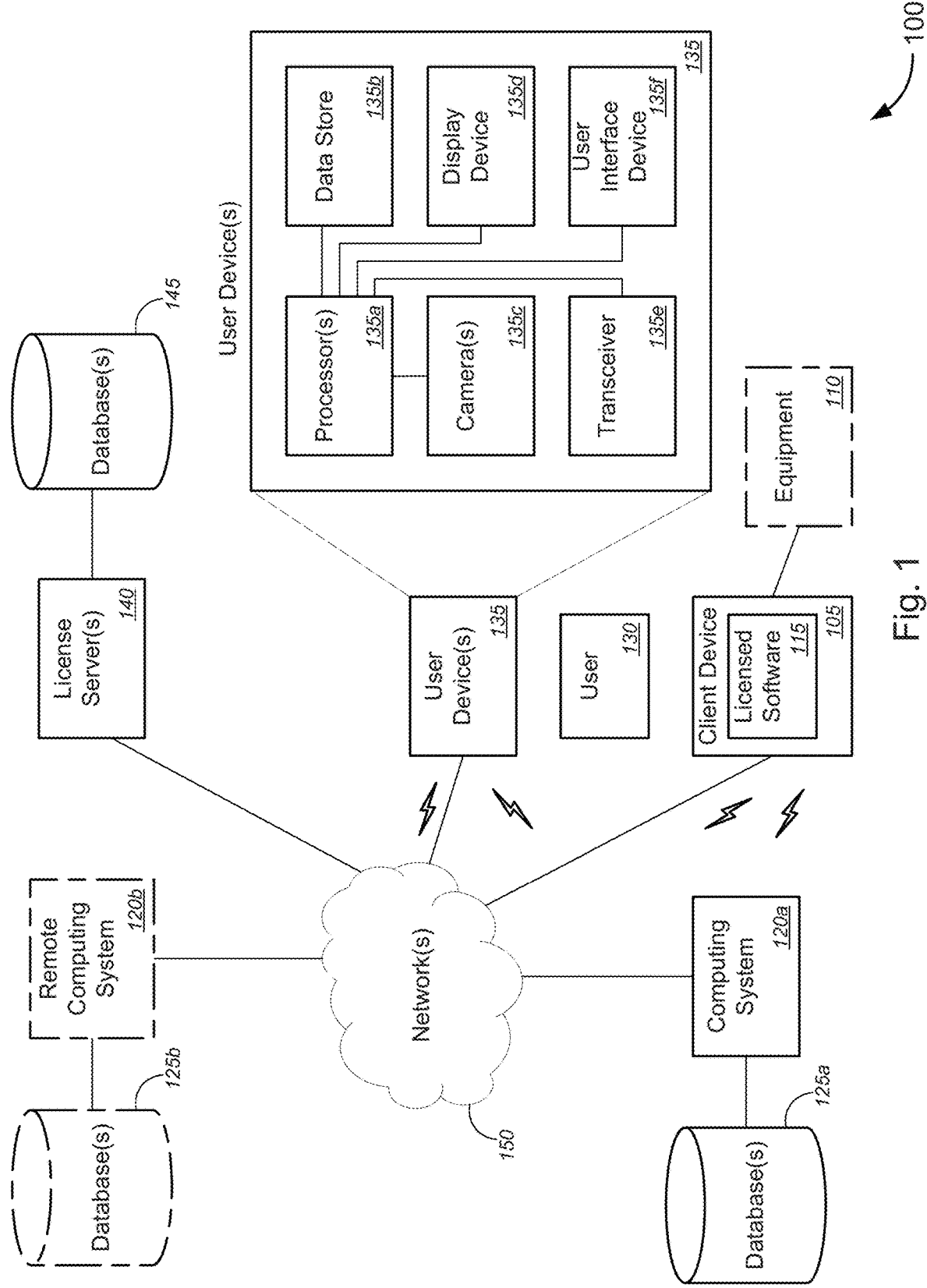
FIG. 1 is a schematic diagram illustrating a system for implementing software licensing management and authentication, in accordance with various examples.

Various examples provide tools and techniques for implementing software licensing management and authentication, and, more particularly, to methods, systems, and apparatuses for implementing software licensing management and authentication regardless of whether a client device associated with a potential licensee is connected with a communication network (e.g., the Internet or other network).

In various examples, a client device, on which a first software (or licensed software) is executed or run, might receive a request by a user to use a requested service using the first software. In some examples, the first software might be software that performs operations on the client device, without operating or controlling any external hardware or equipment. Alternatively, the first software might be software for operating or controlling equipment, which might include, without limitation, an atomic absorption ("AA") system, a capillary electrophoresis ("CE") system, a dissolution system, an optical emission spectrometry ("OES") system, an inductively coupled plasma ("ICP") OES system, a gas chromatography ("GC") system, a GC mass spectrometry ("MS") system, a gel permeation chromatography ("GPC") system, a mass spectrometer, an ICP-MS system, an infrared spectroscopy system, a Fourier Transform infrared ("FT-IR") spectroscopy system, a liquid chromatography ("LC") system, a LC-MS system, a microfluidics system, a sample preparation ("SP") system, a supercritical fluid chromatography ("SFC") system, an ultraviolet-visible ("UV-Vis") spectrophotometer, or other laboratory instrumentation, and/or the like. In an example, the equipment might be any non-laboratory equipment that is operated by first software that requires licensing management and authentication to function.

In response to receiving the request, the client device might initiate authentication protocols of the first software that cause generation of a unique identifier associated with at least one of the requested service or the first software and to present a prompt to the user to request an unlock code using the generated unique identifier.

A computing system might receive a request for the unlock code. In an example, the request for the unlock code might comprise the generated unique identifier, and the generated unique identifier might comprise licensing information. In response to receiving the generated unique identifier, the computing system might determine whether the user should have access to the requested service using the first software based at least in part on the licensing information embedded in the generated unique identifier. In an example, such determination might comprise extracting the licensing information embedded in the unique identifier. The computing system might then determine whether the user should have access to the requested service using the first software, based at least in part on the licensing information and at least one of stored information regarding at least one of the user, an entity with which the user is associated, the requested service, or the first software, and/or the like.

Based on a determination that the user should have access to the requested service using the first software, the computing system might generate an unlock code associated with the requested service using the first software and might deduct cost associated with the licensing information. In an example, the unlock code might be a per-session code for unlocking a single session use of the requested service using the first software. In an example, the unlock code might comprise embedded data, including, but not limited to, at least one of security-related data, data associated with the generated unique identifier, data regarding type of user, data regarding whether the user is under requirement of payment, session identification data, data regarding type of service requested, or data regarding type of hardware associated with the requested service, and/or the like.

The computing system might send the unlock code to the user. The client device might receive the unlock code. In response to receiving the unlock code, client device might verify the unlock code. In response to the unlock code being verified, client device might unlock the single session use of the requested service using the first software to allow the user to access the single session use of the requested service using the first software.

In some examples, the licensing information might include, without limitation, at least one of data regarding the requested service using the first software, session data for session use of the requested service, data regarding type of system for providing the requested service, information regarding type of license associated with at least one of the requested service or the first software, information regarding time that the generated unique identifier was generated, information regarding session information validation, information regarding cost corresponding to the license associated with the at least one of the requested service or the first software, information regarding conditions associated with the license, information regarding limitations associated with the license, information regarding type of hardware associated with the first software, information regarding type of hardware associated with the requested service, or information regarding a session use of the requested service, and/or the like.

In an example, the type of license might include, but is not limited to, one of a pay per use license, a period subscription license, a right to use license, or a free to use license, and/or the like. In an example, a pay per use license might include, without limitation, a single license that is valid for a single use, a single license that is valid for a limited number of uses, or a series of licenses that is valid for a limited number of uses, etc. In an example, a period subscription license might include, but is not limited to, a license that is valid for unlimited use within a limited subscription period (e.g., a day use license, a multi-day use license, a week use license, a multi-week use license, a month use license, a multi-month use license, a quarter year use license, a half year use license, an annual use license, and so on), or a license that is valid for conditional or limited use within a limited subscription period (e.g., a license that is limited to a particular user, a license that allows multiple users to use one at a time (i.e., a seat license), etc.), or the like. In an example, a right to use license might include, without limitation, an unlimited use license that is without limitations as to number of uses or period of use, etc. In an example, a free to use license might include, but is not limited to, a no-charge use license, or the like.

Merely by way of example, presenting the prompt to the user to request an unlock code using the generated unique identifier might comprise presenting two or more options that include, without limitation, displaying the generated unique identifier and a communication device (or contact information) for the user to use or contact and to provide (e.g., by speaking, by typing, by copying and pasting, etc.) the generated unique identifier; displaying a connection mechanism (e.g., a link or a hyperlink, or the like) to a collection of information (e.g., a webpage, a database, a server, a data repository, or the like), the connection mechanism including the generated unique identifier; or displaying a visual code and a prompt for the user to scan the visual code, the visual code containing data associated with the generated unique identifier; and/or the like. In an example, the visual code might include, but is not limited to, one of a bar code or a quick response ("QR") code, and/or the like.

In some examples, receiving the generated unique identifier contained in the received request for the unlock code might include, but is not limited to, one of: receiving and converting, via speech-to-text conversion, the generated unique identifier that is spoken by the user over a telephone; receiving, via text input field, the generated unique identifier that is manually entered by the user or another user via a user interface; receiving, via text input field, the generated unique identifier that is copied and pasted by the user via the user interface; receiving the generated unique identifier as a visual code, an image of which is captured by the user using a camera of a user device; or receiving the generated unique identifier from the client device via network communication when the client device is connected to a communication network (e.g., the Internet or other network); and/or the like. In an example, the image of the visual code, when captured, might trigger one of sending the generated unique identifier to the computing system over a network or accessing a collection of information (e.g., a webpage, website, or web portal, or the like) that allows the user to manually enter the generated unique identifier.

In accordance with the various examples described herein, the software licensing management and authentication system and functionality provides the traceability and security of the communication network connection model, while allowing for the flexibility of the pay per use model. The software licensing management and authentication system and functionality also provides an easy path of licensing communication to a license server(s) for users without connection to a communication network. In fact, the software licensing management and authentication system and functionality covers the spectrum of use cases, allowing for secure licensing with the flexibility of the pay per use model: (a) No connection; (b) Limited connection via a phone data plan; or (c) Full communication network (e.g. Full Internet connectivity, or the like). In the no connection model, the licensee may use a telephone to communicate the short and easy to speak set of characters to the license server(s). In the limited connection model, the licensee may use his, her, or their phone to capture the license code and communicate it (either verbally or via dual-tone multi-frequency ("DTMF") signaling input, or the like) to the license server(s). In the full communication network connectivity use case, the software handles all communication silently for the licensee (i.e., handles all communication between the client device and the license server(s) in the background, or the like). According to some examples, some key characteristics or benefits of the software licensing management and authentication system and functionality might include, but are not limited to, creation of a unique identifier, with licensing information embedded or "buried" in the identifier; providing multiple paths for unlocking a license (including, without limitation, (a) speaking the identifier, unlock code numbers, and/or letters over the phone; (b) via a smartphone; or (c) silently or in a background process(es) over the communication network; or the like); tying the identifier and, the unlock code uniquely to one another; and/or the like.

These and other aspects of the software licensing management and authentication system and functionality are described in greater detail with respect to the figures. In some aspects, the software licensing management and authentication system and functionality may also be integrated with a smart lab, content management, or lab workflow management systems, such as, but not limited to, Agilent OpenLab® or other similar software suite, or the like.

The following detailed description illustrates a few exemplary examples in further detail to enable one of skill in the art to practice such examples. The described examples are provided for illustrative purposes and are not intended to limit the scope of the invention.

In the following description, for the purposes of explanation, numerous specific details are set forth in order to provide a thorough understanding of the described examples. It will be apparent to one skilled in the art, however, that other examples of the present invention may be practiced without some of these specific details. In other instances, certain structures and devices are shown in block diagram form. Several examples are described herein, and while various features are ascribed to different examples, it should be appreciated that the features described with respect to one example may be incorporated with other examples as well. By the same token, however, no single feature or features of any described example should be considered essential to every example of the invention, as other examples of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included." should be considered non-exclusive. Also, terms such as "element" or "component" encompass both elements and components comprising one unit and elements and components that comprise more than one unit, unless specifically stated otherwise.

Various examples described herein, while embodying (in some cases) software products, computer-performed methods, and/or computer systems, represent tangible, concrete improvements to existing technological areas, including, without limitation, licensing management technology, licensing authentication technology, licensing management and authentication technology, and/or the like. In other aspects, certain examples, can improve the functioning of user equipment or systems themselves (e.g., licensing management servers or systems, licensing authentication servers or systems, licensing management and authentication servers or systems, etc.), for example, by receiving a request by a user to use a requested service using a first software; in response to receiving the request, initiating authentication protocols of the first software that cause generation of a unique identifier associated with at least one of the requested service or the first software and to present a prompt to the user to request an unlock code using the generated unique identifier; receiving a request for the unlock code for a requested service using a first software, wherein the request for the unlock code comprises the generated unique identifier, wherein the generated unique identifier comprises licensing information; in response to receiving the generated unique identifier, determining whether the user should have access to the requested service using the first software based at least in part on the licensing information embedded in the generated unique identifier; based on a determination that the user should have access to the requested service using the first software, generating an unlock code associated, with the requested service using the first software, and sending the unlock code to the user; receiving the unlock code; in response to receiving the unlock code, verifying the unlock code; and in response to the unlock code being verified, unlocking the single session use of the requested service using the first software to allow the user to access the single session use of the requested service using the first software; and/or the like.

In particular, to the extent any abstract concepts are present in the various examples, those concepts can be implemented as described herein by devices, software, systems, and methods that involve specific novel functionality (e.g., steps or operations), such as, generating a unique identifier that has embedded therein licensing information comprising at least one of data regarding the requested service using the first software, session data for session use of the requested service, data regarding type of system for providing the requested service, or information regarding type of license associated with at least one of the requested service or the first software; using the unique identifier as one-half of a handshake between a client computer and a license server; generating an unlock code that has embedded therein data comprising at least one of security-related data, data associated with the generated unique identifier, data regarding type of user, data regarding whether the user is under requirement of payment, session identification data, data regarding type of service requested, or data regarding type of hardware associated with the requested service, wherein the unlock code is a per-session code for unlocking a single session use of the requested service using the first software and is the second half of the handshake between the client computer and the license server; and/or the like, to name a few examples, that extend beyond mere conventional computer processing operations. These functionalities can produce tangible results outside of the implementing computer system, including, merely by way of example, optimized licensing management and authentication functionalities that address the limitations, security vulnerabilities, and cheating inherent with conventional licensing management and authentication systems, and/or the like, at least some of which may be observed or measured by customers and/or service providers.

SUMMARY OF THE INVENTION

In an aspect, a method might comprise receiving a request for an unlock code for a requested service using a first software from a user using a client device on which the first software is executed. The request for the unlock code might comprise a generated unique identifier associated with at least one of the requested service or the first software. The generated unique identifier might comprise licensing information. The licensing information might be embedded within the generated unique identifier. The licensing information might comprise at least one of data regarding the requested service using the first software, session data for session use of the requested service, data regarding type of system for providing the requested service, or information regarding type of license associated with at least one of the requested, service or the first software, and/or the like.

In response to receiving the generated unique identifier, the method might further comprise, extracting the licensing information embedded in the unique identifier. The method might further comprise determining whether the user should have access to the requested service using the first software based at least in part on the licensing information and at least one of stored information regarding at least one of the user, an entity with which the user is associated, the requested service, or the first software, and/or the like.

The method might further comprise, based on a determination that the user should have access to the requested service using the first software, generating an unlock code associated with the requested service using the first software and deducting cost associated with the licensing information. The method might further comprise sending the unlock code to the user. The unlock code might be a per-session code for unlocking a single session use of the requested service using the first software.

In an example, the licensing information might further comprise one or more of information regarding time that the generated unique identifier was generated, information regarding session information validation, information regarding cost corresponding to the license associated with the at least one of the requested service or the first software, information regarding conditions associated with the license, information regarding limitations associated with the license, information regarding type of hardware associated with the first software, information regarding type of hardware associated with the requested service, or information regarding a session use of the requested service, and/or the like. The type of license might comprise one of a pay per use license, a period subscription license, a right to use license, or a free to use license, and/or the like.

In an example, the pay per use license might comprise a use license based on a purchased or pre-purchased number of credits. The requested service among a plurality of available services might cost a predetermined number of credits per session use. In such an example, the method might further comprise after generating the unlock code, decrementing a counter indicating a remaining number of credits among the purchased or pre-purchased number of credits by the predetermined number of credits per session use. The counter might be associated with the user or an entity with which the user is associated.

In an example, the method might further comprise receiving, decrypting, and authenticating a refund code from the user. The method might further comprise, in response to receiving, decrypting, and authenticating the refund code, invalidating the current single session use of the requested service using the first software, and incrementing the counter indicating the remaining number of credits by the predetermined number of credits per session use for the requested service. In an example, an option to access the refund code might be available before a deliverable end to the single session use of the requested service using the first software. Said option to access the refund code might be inactivated once the deliverable end to the single session use has occurred.

In an example, the method might further comprise receiving, decrypting, and authenticating a purchase code from the user. The purchase code might correspond to purchase of one or more additional credits. In an example, the method might further comprise in response to receiving, decrypting, and authenticating the purchase code, incrementing the counter indicating the remaining number of credits by the purchased one or more additional credits. In an example, at least one of the purchased or pre-purchased number of credits, the remaining number of credits, or the one or more additional credits might be assignable to at least one of an entity associated with the pay per use license, an account associated with the entity, or one or more individuals associated with the entity, and/or the like.

In an example, receiving the generated unique identifier contained in the received, request for the unlock code might comprise one of: receiving and converting, via speech-to-text conversion, the generated unique identifier that is spoken by the user over a telephone; receiving, via text input field, the generated unique identifier that is manually entered by the user or another user via a user interface; receiving, via text input field, the generated unique identifier that is copied and pasted by the user via the user interface; receiving the generated unique identifier as a visual code, an image of which is captured by the user using a camera of a user device; or receiving the generated unique identifier from the client device via network communication when the client device is connected to a communication network; and/or the like. In an example, the image of the visual code, when captured, might trigger one of sending the generated unique identifier to the computing system over a network or accessing a collection of information that allows the user to manually enter the generated unique identifier.

In an example, the unlock code might comprise embedded data comprising at least one of security-related data, data associated with the generated unique identifier, data regarding type of user, data regarding whether the user is under requirement of payment, session identification data, data regarding type of service requested, or data regarding type of hardware associated with the requested service, and/or the like.

In an example, generating the unlock code associated with the requested service using the first software might comprise permutating the generated unique identifier in a predetermined manner and creating a hash-based message authentication code ("HMAC") using a cryptographic hash function comprising a secure hash algorithm ("SHA"). The secure hash algorithm might comprise one of a SHA-224 algorithm, a SHA-256 algorithm, a SHA-384 algorithm, a SHA-512 algorithm, a SHA-512/224 algorithm, or a SIHA-512/256 algorithm, and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive a request for an unlock code for a requested service using a first software from a user using a client device on which the first software is executed, wherein the request for the unlock code comprises a generated unique identifier associated with at least one of the requested service or the first software, wherein the generated unique identifier comprises licensing information comprises at least one of data regarding the requested service using the first software, session data for session use of the requested service, data regarding type of system for providing the requested service, or information regarding type of license associated with at least one of the requested service or the first software; in response to receiving the generated unique identifier, extract the licensing information embedded in the decrypted generated unique identifier, and determine whether the user should have access to the requested service using the first software based at least in part on the licensing information and at least one of stored information regarding at least one of the user, an entity with which the user is associated, the requested service, or the first software; and based on a determination that the user should have access to the requested service using the first software, generate an unlock code associated with the requested service using the first software; deduct cost associated with the licensing information; and send the unlock code to the user, wherein the unlock code is a per-session code for unlocking a single session use of the requested service using the first software.

In yet another aspect, a method might comprise receiving a request by a user to use a requested service using a first software. The method might further comprise, in response to receiving the request, initiating authentication protocols of the first software that cause generation of a unique identifier associated with at least one of the requested service or the first software and to present a prompt to the user to request an unlock code using the generated unique identifier. The generated unique identifier might comprise licensing information that includes at least one of data regarding the requested service using the first software, session data for session use of the requested service, data regarding type of system for providing the requested service, or information regarding type of license associated with at least one of the requested service or the first software, and/or the like. The generated unique identifier might be sent to and verified by a license server.

The method might further comprise, in response to sending the generated unique identifier to the license server, receiving the unlock code from the license server. The unlock code might be a per-session code for unlocking a single session use of the requested service using the first software. The method might further comprise, in response to receiving the unlock code, verifying the unlock code. The method might further comprise, in response to the unlock code being verified, unlocking the single session use of the requested service using the first software to allow the user to access the single session use of the requested service using the first software.

In an example, the licensing information might further comprise one or more of information regarding time that the generated unique identifier was generated, information regarding session information validation, information regarding cost corresponding to the license associated with the at least one of the requested service or the first software, information regarding conditions associated with the license, information regarding limitations associated with the license, information regarding type of hardware associated with the first software, information regarding type of hardware associated with the requested service, or information regarding a session use of the requested service, and/or the like. The type of license might comprise one of a pay per use license, a period subscription license, a right to use license, or a free to use license, and/or the like.

In an example, the method might further comprise encoding the generated unique identifier. In an example, encoding the generated unique identifier might comprise encoding the generated unique identifier using one of a Base16 encoding scheme, a Base32 encoding scheme, a Base36 encoding scheme, a Base58 encoding scheme, or a Base64 encoding scheme, and/or the like.

In an example, presenting the prompt to the user to request an unlock code using the generated unique identifier might comprise presenting two or more options that comprise: displaying the generated unique identifier and a communication device for the user to use or contact and to provide the generated unique identifier; displaying a connection mechanism to a collection of information, the connection mechanism comprising the generated unique identifier; or displaying a visual code and a prompt for the user to scan the visual code, the visual code containing data associated with the generated unique identifier; and/or the like. In an example, the visual code might comprise one of a bar code or a quick response ("QR") code, and/or the like.

In an example, the method might further comprise, prior to presenting the prompt to the user to request an unlock code using the generated unique identifier, determining whether the client device is connected to a communication network. The method might further comprise, based on a determination that the client device is not connected to a communication network or has limited access to the communication network, graying out the option to display the connection mechanism to the collection of information.

In an example, sending the generated unique identifier to the license server for verification might comprise one of: sending the generated unique identifier that is spoken by the user over a telephone; sending the generated unique identifier that is manually entered by the user or another user via a user interface; sending the generated unique identifier that is copied and pasted by the user via the user interface; sending the generated unique identifier as a visual code, an image of which is captured by the user using a camera of a user device; or sending the generated unique identifier from the client device via network communication when the client device is connected to a communication network; and/or the like. The image of the visual code, when captured, might trigger one of sending the generated unique identifier to the computing system over a network or accessing a collection of information that allows the user to manually enter the generated unique identifier, and/or the like.

In still another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive a request by a user to use a requested service using a first software that is executed on the apparatus; in response to receiving the request to use the first software, initiate authentication protocols of the first software that cause generation of a unique identifier and to present a prompt to the user to request an unlock code using the generated unique identifier, wherein the generated unique identifier comprises licensing information that includes at least one of data regarding the requested service using the first software, session data for session use of the requested service, data regarding type of system for providing the requested service, or information regarding type of license associated with at least one of the requested service or the first software, wherein the generated unique identifier is sent to and verified by a license server; in response to sending the generated unique identifier to the license server, receive the unlock code from the license server, wherein the unlock code is a per-session code for unlocking a single session use of the requested service using the first software; in response to receiving the unlock code, verify the unlock code; and in response to the unlock code being verified, unlock the single session use of the requested service using the first software to allow the user to access the single session use of the requested service using the first software.

Various modifications and additions can be made to the examples discussed without departing from the scope of the invention. For example, while the examples described above refer to particular features, the scope of this invention also includes examples having different combination of features and examples that do not include all of the above described features.

SPECIFIC EXAMPLES

We now turn to the examples as illustrated by the drawings. FIGS. 1-8 illustrate some of the features of the method, system, and apparatus for implementing software licensing management and authentication, and, more particularly, to methods, systems, and apparatuses for implementing software licensing management and authentication regardless of whether a client device associated with a potential licensee is connected with a communication network (e.g., the Internet or other network), as referred to above. The methods, systems, and apparatuses illustrated by FIGS. 1-8 refer to examples of different examples that include various components and steps, which can be considered alternatives or which can be used in conjunction with one another in the various examples. The description of the illustrated methods, systems, and apparatuses shown in FIGS. 1-8 is provided for purposes of illustration and should not be considered to limit the scope of the different examples.

With reference to the figures, FIG. 1 is a schematic diagram illustrating a system 100 for implementing software licensing management and authentication, in accordance with various examples.

In the non-limiting example of FIG. 1, system 100 might comprise a client device 105, equipment 110 (optional), and first software or licensed software 115 running on client device 105. In some examples, licensed software 115 might be software that performs operations on the client device 105, without operating or controlling any external hardware or equipment. Alternatively, the licensed software 115 might be software for operating or controlling equipment 110 (if present), which might include, without limitation, an atomic absorption ("AA") system, a capillary electrophoresis ("CE") system, a dissolution system, an optical emission spectrometry ("OES") system, an inductively coupled plasma ("ICP") OES system, a gas chromatography ("GC") system, a GC mass spectrometry ("MS") system, a gel permeation chromatography ("GPC") system, a mass spectrometer, an ICP-MS system, an infrared spectroscopy system, a Fourier Transform infrared ("FT-IR") spectroscopy system, a liquid chromatography ("LC") system, a LC-MS system, a microfluidics system, a sample preparation ("SP") system, a supercritical fluid chromatography ("SFC") system, an ultraviolet-visible ("UV-Vis") spectrophotometer, or other laboratory instrumentation, and/or the like. In an example, equipment 110 might be any non-laboratory equipment that is operated by licensed software that requires licensing management and authentication to function. In an example, the client device 105 night be one of a laboratory computer that communicates with and controls the equipment 110, a desktop computer that communicates with and controls the equipment 110, a laptop computer that communicates with and controls the equipment 110, a portable computing system that communicates with and controls the equipment 110, a mobile user device that that communicates with and controls the equipment 110, an external dedicated control device that communicates with and controls the equipment 110, or an integrated dedicated control device that controls the equipment 110, and/or the like.

System 100 might further comprise computing system 120a and corresponding database(s) 125a. In an example, the database(s) 125a might be local to (or located proximate to) the computing system 120a (e.g., integrated within the computing system 120a, or the like). In other examples, the database 125a might be external, yet communicatively coupled, to the computing system 120a. Computing system 120a may be located proximate to the client device 105. System 100 might further comprise user 130 and user device(s) 135 that are also located proximate to the client device 105. In some examples, each user device(s) 135 might include, without limitation, a processor(s) 135a, a data store 135b, one or more cameras 135c, a display device 135d, a transceiver 135e, and a user interface device 135f, and/or the like. In an example, the user device(s) 135 might include, without limitation, a smart phone, a mobile phone, a tablet computer, a laptop computer, a desktop computer, or an augmented reality ("AR") headset, and/or the like. AR headsets, for example, are described in detail in U.S. patent application Ser. No. 16/418,818, filed May 21, 2019 by Amir Ben-Dor et al., entitled, "Method and System for Implementing Augmented Reality (AR)-Based Assistance Within Work Environment," which claims priority to U.S. Patent Application Ser. No. 62/675,122 (the "'122 Application"), filed May 22, 2018 by Amir Ben-Dor et al., entitled, "Method and Apparatus for Facilitating Manual Sorting of Objects," the disclosure of each of which is incorporated herein by reference in its entirety for all purposes.

In some examples, the processor(s) 135a might communicatively couple (e.g., via a bus, via wired connectors, or via electrical pathways (e.g., traces and/or pads, etc.) of printed circuit boards ("PCBs") or integrated circuits ("ICs"), and/or the like) to each of one or more of the data store 135b, the one or more cameras 135c, the display device 135d, the transceiver 135e, and the user interface device 135f, and/or the like. The processor(s) 135a might perform functionalities of the user device(s) 135 including, without limitation, cellular communications functionalities, network connectivity functionalities, Internet connectivity functionalities, computational functionalities, image capture functionalities, and/or the like. The data store 135b might store data obtained during performance of the functionalities of the user device(s) 135. The camera(s) 135c may be used to capture images of a unique identifier associated with at least one of a requested service or the licensed software 115, which may be displayed on a display screen (not shown) of the client device 105. In an example, the user device(s) 135, using the camera(s) 135c, may decode or otherwise read the unique identifier to perform functions (e.g., decoding, reading, or scanning a bar code or a QR code, which might, in an example, direct the user to a collection of information (e.g., webpage, website, or web portal, or the like)), among other user device or camera functionalities.

The display screen or display device 135d may be used to display a telephone user interface, to display the collection of information (e.g., webpage, website, or web portal, or the like), to display a computation-based user interface, to display images captured by camera(s) 135c, and/or the like. The transceiver 135e may be used to communicate wirelessly with the computing system 120a or with a communications relay device(s) (not shown). The transceiver 135e may also be used to transfer data, including, but not limited to, data regarding the unique identifier. The transceiver 135e may also be used to communicate with license server(s) 140, either via wireless communications, wired communications, or cellular communications, or the like. The transceiver 135e may also be used to communicate with remote computing system 120b or with a communications relay device(s) (not shown), and/or the like. User interface device 135f might include, but is not limited to, a keypad, a number pad, a keyboard, one or more buttons, one or more switches, one or more lights, and/or a touchscreen display (in which case, the display device 135d and the user interface device 135f might be embodied as a single device), and/or the like. In some examples, wireless communications between or among devices may be used (as depicted in FIG. 1 by lightning bolt symbols between client device 105 and computing system 120a, between client device 105 and network(s) 150, between user device(s) 135 and computing system 120a, and between user device(s) 135 and network(s) 150, or the like). Alternatively, or additionally, wired communications may be in used (as depicted in FIG. 1 by communications lines between client device 105 and computing system 120a via network(s) 150, between client device 105 and network(s) 150, between user device(s) 135 and computing system 120a via network(s) 150, and between user device(s) 135 and network(s) 150, or the like).

In some examples, system 100 might further comprise a license server(s) 140 and corresponding database(s) 145 that is accessible by client device 105, computing system 120a, and/or user device(s) 135 via one or more networks 150. According to some examples, alternative or additional to the computing system 120a and corresponding database 125a being disposed local to (or proximate to) the client device 105, system 100 might comprise remote computing system 120b (optional) and corresponding database(s) 125b (optional) that are remotely located from the client device 105 and that communicatively couple with client device 105, with the user device(s) 135, and/or license server(s) 140 via one or more networks 150. Herein, although some components of system 100 are indicated as being optional while others are not, this is merely for the particular example as shown, and, in other examples, one or more of the former set of components (or components indicated as being "optional") may be required while one or more of the latter set of components (or components not indicated as being "optional") may in fact be optional.

Merely by way of example, network(s) 150 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular example, network(s) 150 might each include an access network of an Internet service provider ("ISP"). In another example, network(s) 150 might each include a core network of the ISP, and/or the Internet.

In operation, client device 105, on which first software or licensed software 115 is executed or run, might receive a request by user 130 to use a requested service using the licensed software 115. In an example, the requested service might include, without limitation, one of an installation qualification ("ITQ") service, a preventative maintenance ("PM") service, a repair qualification ("RQ") service, a functional verification ("FV") service, an operational qualification ("OQ") service, a mechanical qualification ("MQ") service, a performance qualification ("PQ") service, or other service, and/or the like, that may be performed on or using the equipment 110. Alternatively, the requested service might comprise operational use of the licensed software 115. In response to receiving the request, the client device 105 might initiate authentication protocols of the licensed software 115 that cause generation of a unique identifier associated with at least one of the requested service or the licensed software 115 and to present a prompt to the user 130 to request an unlock code using the generated unique identifier.

According to some examples, the unique identifier might be encoded, in an example, using one of a Base16 encoding scheme, a Base32 encoding scheme, a Base36 encoding scheme, a Base58 encoding scheme, or a Base64 encoding scheme, and/or the like. Base32 encoding, Base58 encoding, and the like use character sets that are selected to avoid similar-looking pairs of different symbols. For example, Base32 encoding comprises the twenty-six upper-case letters A-Z and the numerical digits 2-7, where the numerical digits 0, 1, 8, and 9 are removed to avoid confusion with the letters O, I, B, and q, respectively. Variants with Base32 encoding similarly avoid similar-looking pairs of different symbols but use a different character set. Likewise, Base58 encoding comprises the upper-case letters, the lower-case letters, and the numerical digits, except for the upper-case letters O and I, the lower-case letter l, and the numerical digit 0. Although BaseXX encoding is described as a means of encoding the unique identifier, the various examples are not so limited, and the unique identifier may be encoded using any suitable encoding schemes or techniques.

Computing system 120a, remote computing system 120b, and/or license server(s) 140 (collectively, "computing system" or the like) might receive a request for the unlock code. In an example, the request for the unlock code might comprise the generated unique identifier, and the generated unique identifier might comprise licensing information. In response to receiving the generated unique identifier, the computing system might determine whether the user should have access to the requested service using the licensed software 115 (which might be stored in corresponding database(s) 125a, 1251b, and/or 145, or the like) based at least in part on the licensing information embedded in the generated unique identifier. In an example, such determination might comprise extracting the licensing information embedded in the unique identifier. The computing system might then determine whether the user should have access to the requested service using the licensed software 115, based at least in part on the licensing information and at least one of stored information regarding at least one of the user 130, an entity with which the user is associated, the requested service, or the licensed software 115, and/or the like.

Based on a determination that the user should have access to the requested service using the licensed software 115, the computing system might generate an unlock code associated with the requested service using the licensed software 115 and might deduct cost associated with the licensing information. In an example, the unlock code might be a per-session code for unlocking a single session use of the requested service using the licensed software 115. In an example, the unlock code might comprise embedded data, including, but not limited to, at least one of security-related data, data associated with the generated unique identifier, data regarding type of user, data regarding whether the user is under requirement of payment, session identification data, data regarding type of service requested, or data regarding type of hardware associated with the requested service, and/or the like. In an example, generating the unlock code associated with the requested service using the licensed software 115 might comprise permutating the unique identifier in a predetermined manner and creating a hash-based message authentication code ("HMAC") using a cryptographic hash function comprising a secure hash algorithm ("SHA"). In an example, the secure hash algorithm might include, but is not limited to, one of a SHA-224 algorithm, a SHA-256 algorithm, a SHA-384 algorithm, a SHA-512 algorithm, a SHA-512/224 algorithm, or a SHA-512/256 algorithm, and/or the like. Although SHA is described as a means of creating a hash, the various examples are not so limited, and any suitable hash mechanisms or techniques may be used.

The computing system might send the unlock code to the user. The client device 105 might receive the unlock code. In response to receiving the unlock code, client device 105 might verify the unlock code. In response to the unlock code being verified, client device 105 might unlock the single session use of the requested service using the licensed software 115 to allow the user to access the single session use of the requested service using the licensed software 115.

Alternatively, based on a determination that the user should not have access to the requested service using the licensed software 115, the computing system might send or display a message to the user indicating that the unique identifier is invalid or incorrect. In other examples, based on a determination that the unique identifier matches a known but already used unique identifier corresponding to the licensed software 115, the computing system might send or display a message to the user indicating that the unique identifier is no longer valid or has expired. In an example, during the verification process, the unlock code might be deemed to be invalid or expired, in which case, the client device might display a message to the user indicating that the unlock code is invalid or expired.

In some examples, the licensing information might include, without limitation, at least one of data regarding the requested service using the licensed software 115, session data for session use of the requested service, data regarding type of system for providing the requested service, information regarding type of license associated with at least one of the requested service or the licensed software 115, information regarding time that the generated unique identifier was generated, information regarding session information validation, information regarding cost corresponding to (or associated with) the license associated with the at least one of the requested service or the licensed software 115, information regarding conditions associated with the license, information regarding limitations associated with the license, information regarding type of hardware associated with the licensed software 115, information regarding type of hardware associated with the requested service, or information regarding a session use of the requested service, and/or the like.

In an example, the type of license might include, but is not limited to, one of a pay per use license, a period subscription license, a right to use license, or a free to use license, and/or the like. In an example, a pay per use license might include, without limitation, a single license that is valid for a single use, a single license that is valid for a limited number of uses, or a series of licenses that is valid for a limited number of uses, etc. In an example, a period subscription license might include, but is not limited to, a license that is valid for unlimited use within a limited subscription period (e.g., a day use license, a multi-day use license, a week use license, a multi-week use license, a month use license, a multi-month use license, a quarter year use license, a half year use license, an annual use license, and so on), or a license that is valid for conditional or limited use within a limited subscription period (e.g., a license that is limited to a particular user, a license that allows multiple users to use one at a time (i.e., a seat license), etc.), or the like. In an example, a right to use license might include, without limitation, an unlimited use license that is without limitations as to number of uses or period of use, etc. In an example, a free to use license might include, but is not limited to, a no-charge use license, or the like.

In some aspects, a pay per use license might provide a user with one of the following: a single pay per use license might provide the user with a single use; a single pay per use license might provide the user with a predetermined or selected number of uses (e.g., 5 uses, 10 uses, etc.); or a single pay per use license might provide the user with a predetermined or selected number of credits (e.g., 10 credits, 15 credits, 20 credits, etc.), where use of the licensed software 115 to operate one particular instrumentation or equipment 110 or to implement a particular process might require 5 credits, while use of the licensed software 115 to operate or implement another might require 10 credits, and so on; and/or the like. In the case of a refund situation, the use might be credited with another single use, with one more use, or with one or more credits corresponding to the number of credits that the refunded use is worth, and/or the like, respectively corresponding to the types of pay per use licenses discussed above. In an example, a user can purchase additional uses and/or credits. In an example, the cost corresponding to the license might refer to one of: the number of uses remaining for use of the licensed software 115, the number of credits remaining for the use of the licensed software 115, or the number of credits that are required for use of the licensed software 115 to operate a particular instrument or to implement a particular process, and/or the like. For simplicity, without limitation, the examples of FIGS. 2-6 as described utilize the credit-based system, but may alternatively (or additionally) utilize a use-based system, or the like.

Merely by way of example, presenting the prompt to the user to request an unlock code using the generated unique identifier might comprise presenting (on a display screen of the client device (not shown)) two or more options. In an example, the two or more options might include, without limitation, displaying the generated unique identifier and a communication device for the user to use or contact and to provide (e.g., by speaking, by typing, by copying and pasting, etc.) the generated unique identifier (or to use dual-tone multi-frequency ("DTMF") signaling input to manually enter via a telephone number pad or the like). In an example, the two or more options might further include, without limitation, displaying a connection mechanism to a collection of information, the connection mechanism (e.g., a link comprising a uniform resource locator ("URL"), or the like) including the generated unique identifier. In an example, the two or more options might further include, without limitation, displaying a visual code and a prompt for the user to scan the visual code, the visual code containing data associated with the generated unique identifier (and in an example, containing an embedded connection mechanism (e.g., embedded URL, or the like) or containing instructions to connect to a collection of information (e.g., a webpage, a website, or a web portal, or the like)); and/or the like. In an example, the visual code might include, but is not limited to, one of a bar code or a quick response ("QR") code, and/or the like.

In some examples, receiving the generated unique identifier contained in the received request for the unlock code might include, but is not limited to, one of: receiving and converting, via speech-to-text conversion, the generated unique identifier that is spoken by user 130 over a telephone (e.g., user device(s) 135); receiving, via text input field, the generated unique identifier that is manually entered by the user or another user via a user interface; receiving, via text input field, the generated unique identifier that is copied and pasted by the user via the user interface; receiving the generated unique identifier as a visual code, an image of which is captured by the user using a camera of a user device (e.g., camera(s) 135c of user device 135, or the like); or receiving the generated unique identifier from the client device 105 via network communication when the client device 105 is connected to the communication network (e.g., network(s) 150 or the like); and/or the like. In an example, the image of the visual code, when captured, might trigger one of sending the generated unique identifier to the computing system (in some cases, over a network (e.g., network(s) 150)) or accessing a collection of information (e.g., a webpage, a website, or a web portal, or the like) that allows the user to manually enter the generated unique identifier.

These and other functions of the system 100 (and its components) are described in greater detail below with respect to FIGS. 2-4.

Figure 2:
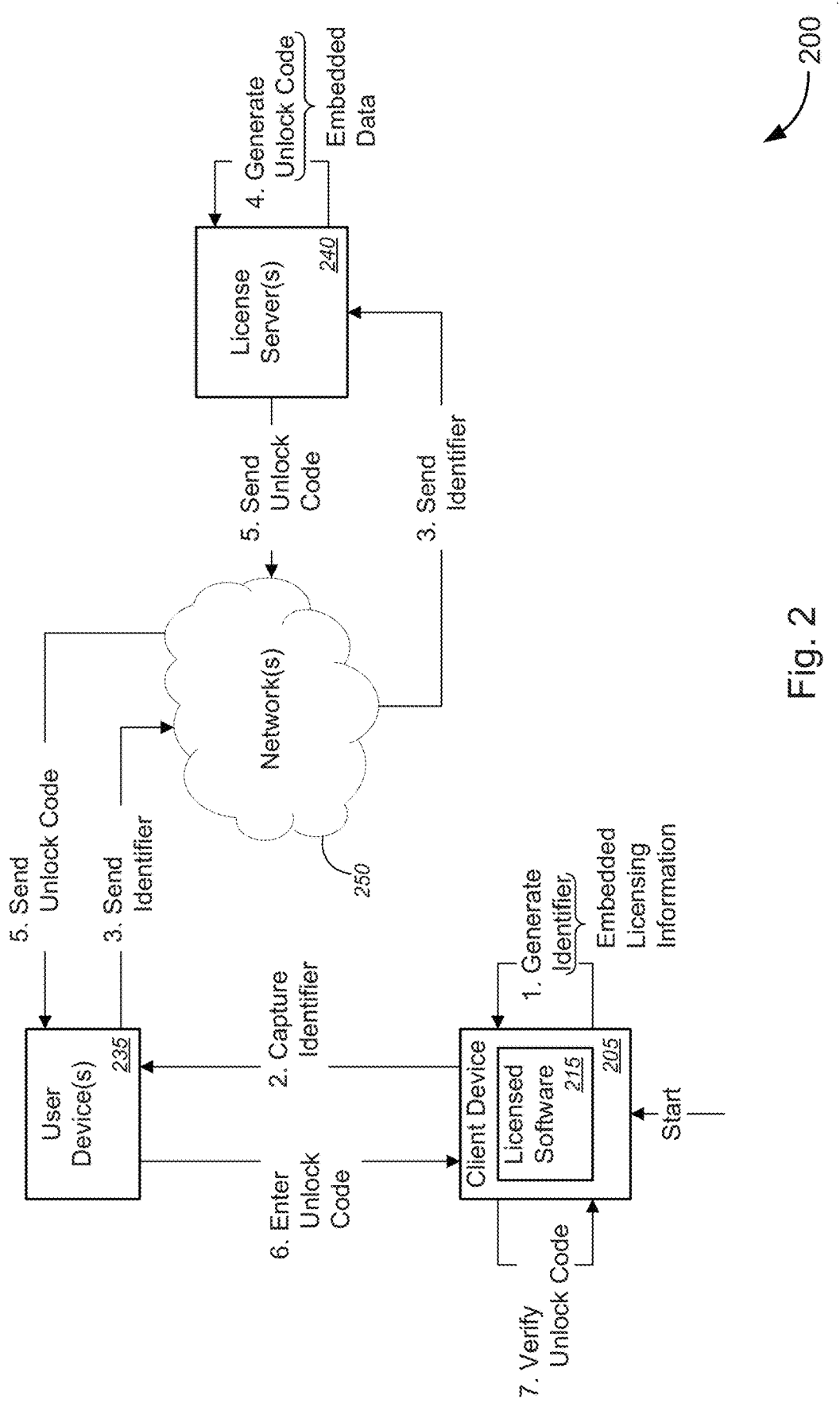
FIG. 2 is a schematic flow diagram illustrating a method for implementing software licensing management and authentication, in accordance with various examples.

FIG. 2 is a schematic flow diagram illustrating a method 200 for implementing software licensing management and authentication, in accordance with various examples.

With reference to the non-limiting example of FIG. 2, method 200 might comprise starting at client device 205, on which licensed software 215 is running or executed. At Step 1, the client device might generate a unique identifier associated with at least one of a requested service or the licensed software 215, in an example, in response to a request by a user to use the requested service using the licensed software 215. In an example, the unique identifier—which might be embodied as a session code, or the like—might comprise embedded licensing information. The licensing information might include, but is not limited to, at least one of data regarding the requested service using the licensed software 215, session data for session use of the requested service, data regarding type of system for providing the requested service, information regarding type of license associated with at least one of the requested service or the licensed software 215, information regarding time that the generated unique identifier was generated, information regarding session information validation, information regarding cost corresponding to the license associated with the at least one of the requested service or the licensed software 215, information regarding conditions associated with the license, information regarding limitations associated with the license, information regarding type of hardware associated with the licensed software 215, information regarding type of hardware associated with the requested service, or information regarding a session use of the requested service, and/or the like. In an example, the type of license might include, without limitation, one of a pay per use license, a period subscription license, a right to use license, or a free to use license, and/or the like.

At Step 2, a user device(s) 235 (e.g., a smart phone, a mobile phone, a tablet computer, a laptop computer, AR headset, or the like) might capture the unique identifier (which might be displayed on a display screen of the client device 205 (not shown)). At Step 3, the user device(s) 235 might send the unique identifier, via network(s) 250, to license server(s) 240. Alternatively, sending the unique identifier might comprise one of sending the unique identifier that is spoken by the user over a telephone (e.g., the user device(s) 235, or the like); sending the unique identifier that is manually entered by the user or another user via a user interface; sending the unique identifier that is copied and pasted by the user via the user interface; sending the unique identifier as a visual code, an image of which is captured by the user using a camera of a user device; or sending the unique identifier from the client device via network communication when the client device is connected to a communication network (e.g., network(s) 250, or the like).

At Step 4, in response to receiving the unique identifier, the license server(s) 240 might extract the licensing information embedded in the unique identifier. The license server(s) 240 might then determine whether the user should have access to the requested service using the licensed software 215, based at least in part on the licensing information and at least one of stored information regarding at least one of the user, an entity with which the user is associated, the requested service, or the licensed software, and/or the like. Based on a determination that the user should have access to the requested service using the licensed software 215, the license server(s) 240 might generate an unlock code that is associated with the requested service using the licensed software 215 and might deduct cost associated with the licensing information. In an example, the unlock code might be a per-session code for unlocking a single session use of the requested service using the licensed software 215. In an example, the unlock code might comprise embedded data, including, but not limited to, at least one of security-related data, data associated with the generated unique identifier, data regarding type of user, data regarding whether the user is under requirement of payment, session identification data, data regarding type of service requested, or data regarding type of hardware associated with the requested service, and/or the like.

At Step 5, the license server(s) 240 might send the unlock code to the user device(s) 235 via network(s) 250. At Step 6, the user device(s) 235 might enter the unlock code on the client device 205—which might comprise prompting the user to manually enter the unlock code that is displayed on a display screen (not shown) of the user device(s) 235, or sending a signal from the user device(s) 235 to the client device 205 with instructions to fill in the unlock code (also contained in the signal) in an appropriate field as displayed on the display screen (not shown) of the client device 205. At Step 7, the client device 205 (or the licensed software 215) might verify the unlock code. Once verified, the client device 205 might unlock the single session use of the requested service using the licensed software 215 to allow the user to access the single session use of the requested service using the licensed software 215. During the verification process, if the unlock code is deemed to be invalid, or expired, the client device 205 might display a message to the user indicating that the unlock code is invalid or expired.

The process of license management and authentication of FIG. 2 might otherwise be similar, if not identical, to that described above with respect to operation of system 100 of FIG. 1.

FIGS. 3A-3F (collectively, "FIG. 3") are schematic diagrams illustrating various non-limiting examples 300 of software interfaces, web interfaces, pop-up windows, or other user interfaces that may be used for implementing software licensing management and authentication, in accordance with various examples. Although FIG. 3 depicts a particular set of examples for implementing software license management and authentication, specifically for unlocking a software session for using a particular laboratory instrumentation under a pay per use license situation, the various examples are merely provided for purposes of illustration and are not so limited. Accordingly, the license management and authentication as depicted in FIG. 3 may be adapted for license management and authentication of any suitable type of software that requires authentication to function and that can be used to operate or control equipment (or can alternatively be used for software running only on the client device without operating or controlling any external hardware or equipment). The license management and authentication as depicted in FIG. 3 may be used in any suitable use license scenario (whether pay per use, period subscription use, or right to use, etc.).

Figure 3A:
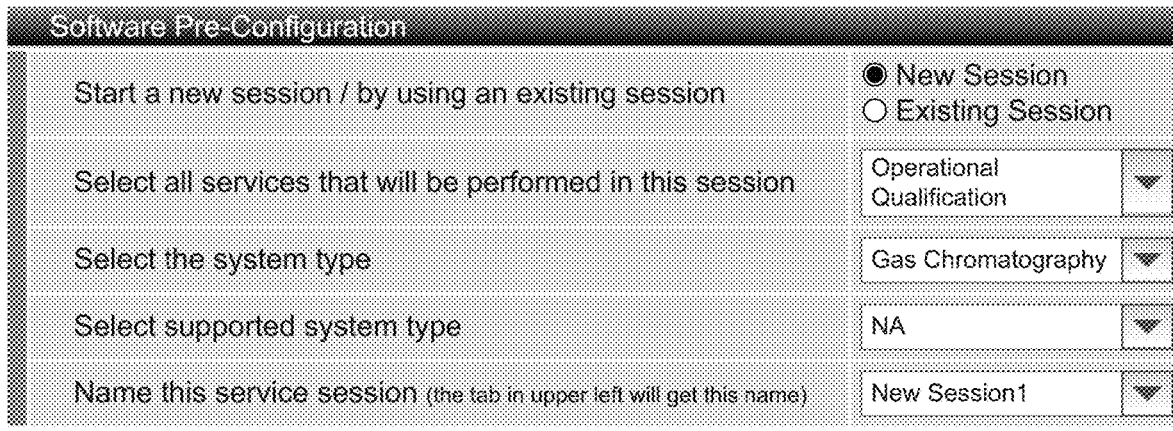
FIGS. 3A-3F are schematic diagrams illustrating various non-limiting examples of software interfaces, web interfaces, pop-up windows, or other user interfaces that may be used for implementing software licensing management and authentication, in accordance with various examples.

Referring to FIG. 3A, a software pre-configuration screen 305 is shown, in which a user can select (using the radial buttons depicted in FIG. 3A or other selection mechanism) a new session or an existing session. The software pre-configuration screen 305 also allows the user to select one or more services that will be performed in the selected session (using a drop-down list as shown in FIG. 3A, or the like; e.g., "operational qualification" or the like). With the software pre-configuration screen 305, the user can also select the system type (also using a drop-down list as shown in FIG. 3A, or the like; e.g., "Gas Chromatography" or the like). The software pre-configuration screen 305 also allows the user to select supported system type (also using a drop-down list as shown in FIG. 3A, or the like; e.g., "NA" (or not applicable), or the like). Further, with the software pre-configuration screen 305, the user can name the selected session (also using a drop-down list as shown in FIG. 3A, or the like, which in an example, may also be a manual-entry drop-down list to allow the user the manually enter characters while providing drop-down list functionality; e.g., "New Session 1" or the like), and so on.

Figure 3B:

Turning to FIG. 3B, an unlock session pop-up window or screen 310 might display a session code (in this case, "0800-0002-0000-0PAE-M81G") in session code field 315. The session code is a unique identifier associated with the software that must be authenticated in order to operate or control the system selected in the software pre-configuration screen 305 as shown in FIG. 3A and/or to run the selected session shown in FIG. 3A. In an example, the unique identifier comprises a unique sequence of numbers, alphabetic characters, alphanumeric characters, special characters, or a combination thereof (collectively, "unique sequence of characters" or the like) that are used to identify the part of the software being used. Embedded in this unique sequence of characters are at least two key pieces of information: the technique or service being licensed (e.g., gas chromatography, liquid chromatography, mass spectrometry, other laboratory-based analysis, a non-laboratory-based service (e.g., apps or computer program, etc.), or the like) and the service that the system is providing (e.g., operation qualification, installation qualification, etc.). Given these two pieces of information, the system can determine how many license credits to charge the user. According to some examples, this identifier might be forever tied to the particular run of the session that the user (e.g., field engineer or the like) is starting. Here, there is a one-to-one correspondence between a session (or run) and an identifier.

In an example, the unique identifier might also have other licensing information embedded therein, including, but not limited to, at least one of session data for session use of the requested service, information regarding type of license associated with at least one of the requested service or the software, information regarding time that the unique identifier was generated, information regarding session information validation, information regarding cost corresponding to the license associated with the at least one of the requested service or the software, information regarding conditions associated with the license, information regarding limitations associated with the license, information regarding type of hardware associated with the software, information regarding type of hardware associated with the requested service, or information regarding a session use of the requested service, and/or the like. In an example, the type of license might include, without limitation, one of a pay per use license, a period subscription license, a right to use license, or a free to use license, and/or the like.

The unlock session pop-up window or screen 310 might further display a message to contact a communication device (in this case, call a telephone number, "1-800-123-4567") displayed in contact information field 320 to unlock the selected session. The unlock session pop-up window or screen 310 might alternatively, or additionally, display an alternative option to navigate to the collection of information (e.g., webpage, website, or web portal, or the like), by following a connection mechanism (e.g., uniform resource locator ("URL") displayed in connection mechanism field 325 (in this case, "https://crosslablicense-dev.agilent.com/LicensingWebClient/AceSession/Unlock?SessionCode=0800000200000PAEM81G"). The unlock session pop-up window or screen 310 might alternatively, or additionally, display a visual code 330 (including, but not limited to, a bar code (not shown) or a quick response ("QR") code (shown in FIG. 3B), or the like). The visual code 330, when scanned by a suitable code reader or scanner (e.g., a smart phone or tablet computer, or the like, running a bar code or QR code scanner software application ("app"), or a dedicated scanner device, or the like), may direct the user to a collection of information (e.g., webpage, website, or web portal, or the like) that provides the user with access to an unlock code. Alternatively, the unlock session pop-up window or screen 310 might display a connection mechanism (e.g., URL) shown in connection mechanism field 325. In an example, when the user clicks or selects the connection mechanism, the user is navigated to the collection of information (such as the unlock a session window 345 shown in FIG. 3C, or the like), and an appropriate input field may be auto-filled with the session code (as shown in session code field 315).

The unlock session pop-up window or screen 310 might further display an unlock code field 335 and corresponding unlock session button 340. In this manner, after the unique identifier (i.e., session code) is generated, the software application halts and awaits input of the unlock code, and the unique identifier is displayed for the user (e.g., field engineer or the like) to capture. Here, as shown in FIG. 3B, multiple paths are presented in the dialog or screen 310: the user can follow the connection mechanism provided (such as in the communication network connectivity case); the user can use a smartphone or other user device to scan and activate the visual code (in this case, the QR code; such as in the user device data plan case); or the user can manually speak the identifier over the telephone (such as in the telephone input case); or the like.

Figure 3C:
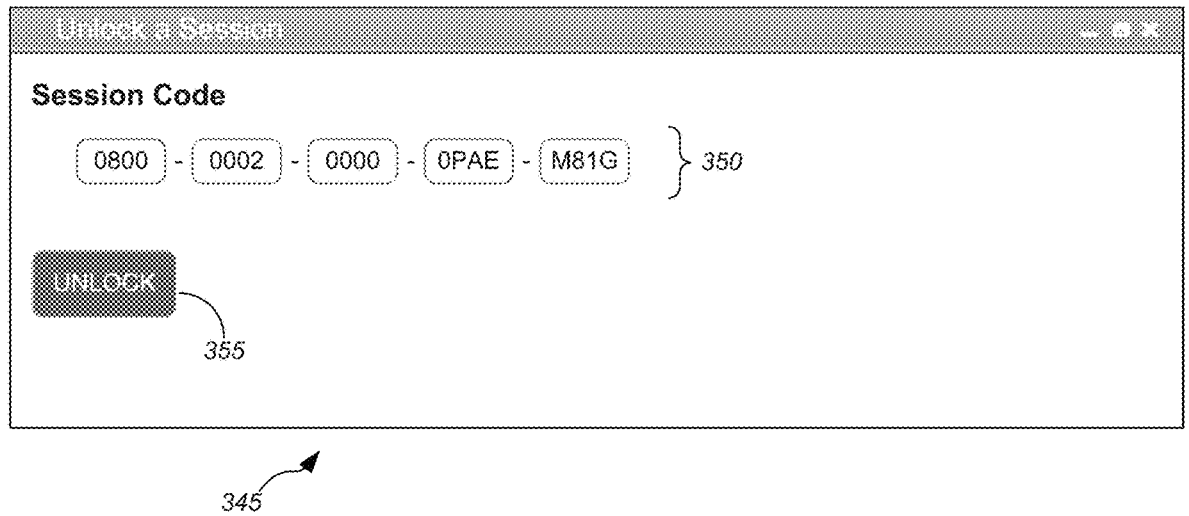

With reference to FIG. 3C, following the connection mechanism or the visual code might bring the user to an unlock a session window, pop-up window, or screen 345 at the license server (after the user logs in, which is omitted for clarity). The unlock a session window, pop-up window, or screen 345 might display a session code input field or set of input fields 350 that may allow for manual input of the session code or may allow for auto-filling with the session code. For manual input, the user may manually type, or copy and paste, the session code (shown in session code field 315 of the unlock session pop-up window or screen 310 of FIG. 3B) into the input field or set of input fields 350. For auto-filling, the input field or set of input fields 350 may be auto-filled with the session code, either when the user clicks on the connection mechanism (e.g., URL, or the like) in the connection mechanism field 325 of the unlock session pop-up window or screen 310 of FIG. 3B, or when the user scans the visual code 330 of the unlock session pop-up window or screen 310 of FIG. 3B, or the like. After the session code input field or set of input fields 350 has been filled with the session code or identifier (in this case, "0800-0002-0000-0PAE-M81G"), the user can press, depress, or select (collectively, "click" or the like) the unlock button 355. Once the unlock button 355 is clicked, the pool of available credits associated with the user or an entity with which the user is associated (e.g., company, organization, or the like) is validated, and the user is charged for the use of this combination of service and technique by using a counter to deduct from, or decrement, the pool of available credits by a predetermined number of credits per session use for the requested service.

Figure 3D:
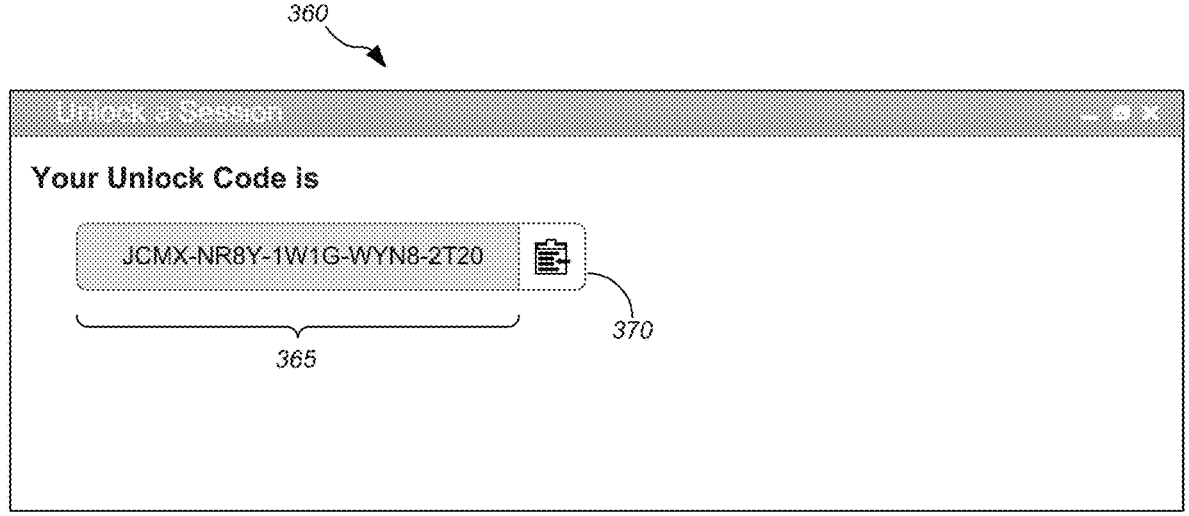

Turning to FIG. 3D, assuming that the session code entered in the session code input field or set of input fields 350 of the unlock a session window, pop-up window, or screen 345 of FIG. 3C is valid and corresponds to the requested service and/or the software for running the session, another unlock a session window, pop-up window, or screen 360 might be displayed. The another unlock a session window, pop-up window, or screen 360 might display an unlock code field 365 containing the unlock code (in this case, "JCMX-NR8Y-1W1G-WYN8-2T20"), and, in an example, might also display a copy button 370. The copy button 370, when pressed, depressed, or selected, might copy the unlock code displayed in the unlock code field 365 for subsequent pasting in the unlock code field 335 in the unlock session window 310 (shown in FIG. 3B, or the like). In some examples, the session code is modified in a known and/or reproducible way, then it is hashed using a cryptographic hash function to create a hash-based message authentication code ("HMAC"). In an example, the cryptographic hash function might comprise a secure hash algorithm ("SHA"), which might include, but is not limited to, one of a SHA-224 algorithm, a SHA-256 algorithm, a SHA-384 algorithm, a SHA-512 algorithm, a SHA-512/224 algorithm, or a SHA-512/256 algorithm, and/or the like. The resultant code (i.e., unlock code) is created and is very highly likely unique to only this identifier or session code.

In an example, the unlock code might be a per-session code for unlocking a single session use of the requested service using the software. In an example, the unlock code might comprise embedded data, including, but not limited to, at least one of security-related data, data associated with the generated unique identifier, data regarding type of user, data regarding whether the user is under requirement of payment, session identification data, data regarding type of service requested, or data regarding type of hardware associated with the requested service, and/or the like.

Figure 3E:
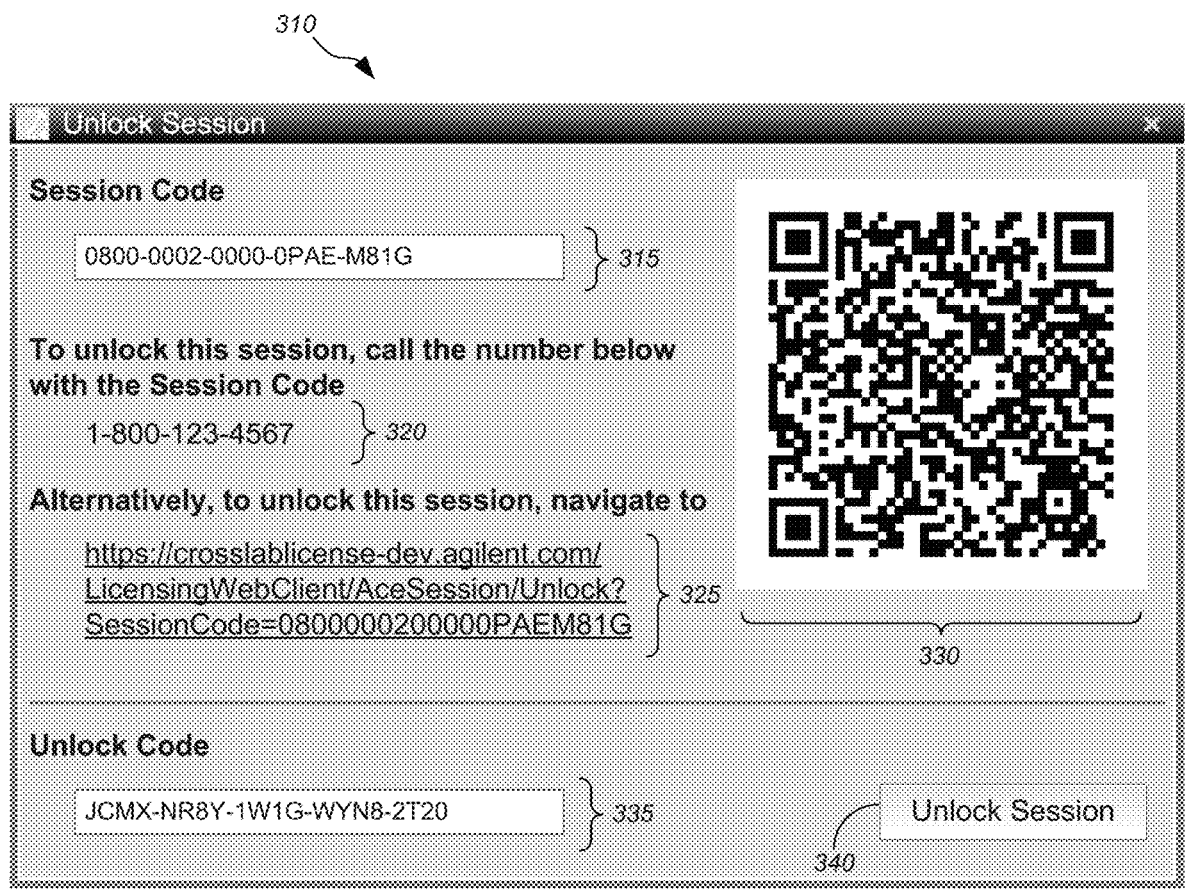

Subsequently, the user might fill in the unlock code (in this case, "JCMX-NR8Y-1W1G-WYN8-2T20") in the blank unlock code field 335 of the unlock session pop-up window or screen 310 of FIG. 3B. The user may do so by manually typing in the unlock code or by pasting the copied unlock code (after using the copy button 370 of the unlock a session window, pop-up window, or screen 360 of FIG. 3D). Referring to FIG. 3E, in which the unlock code field 335 has been filled with the unlock code, the user may then press, depress, or select the unlock session button 340, thereby initiating unlock code verification processes. Once verified, the unlock code would unlock the session and would allow the user to access the single session use of the requested service using the software.

Figure 3F:
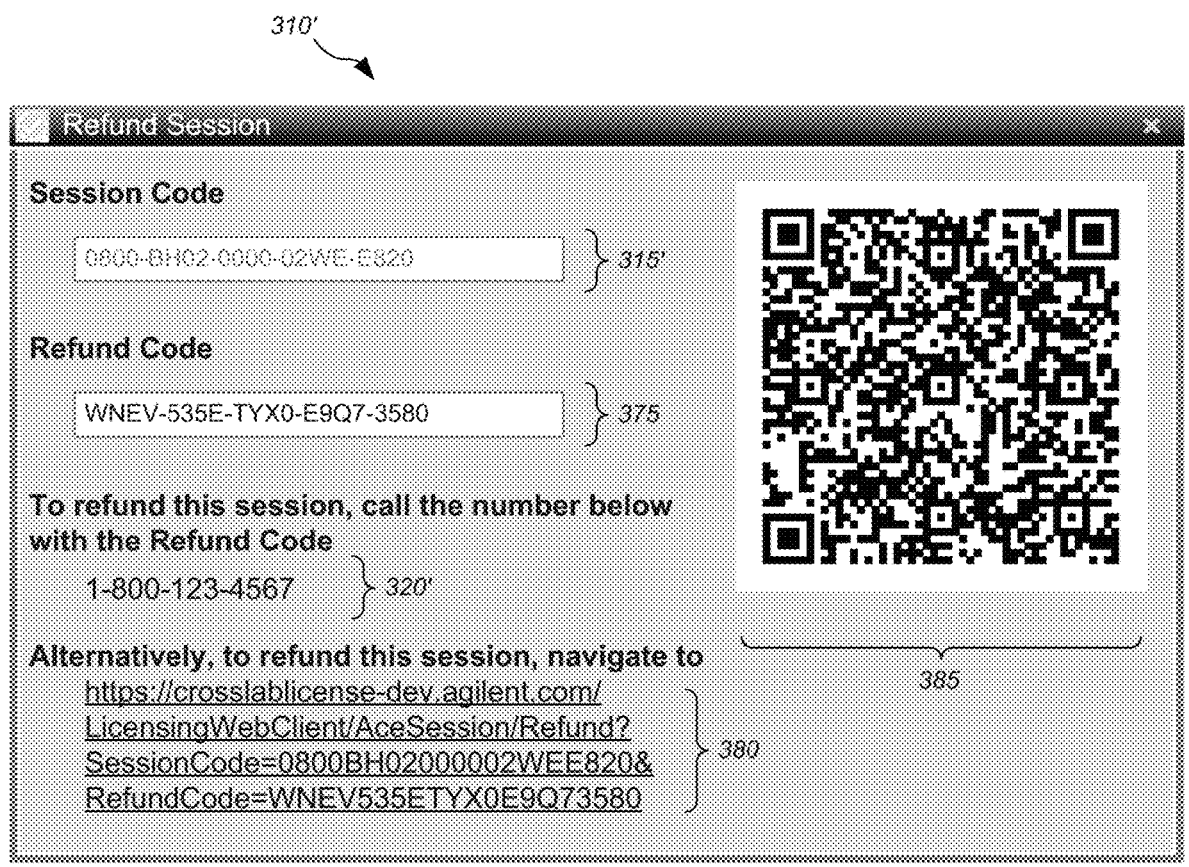

FIG. 3F depicts a situation in which the user requests a refund (e.g., due to the requested service and/or the software not being used after authentication protocols have commenced, due to the requested service and/or the software not completing properly due to technical issues, or due to the user not completing, or not being able to complete, the licensed task, or the like), and the user successfully proves that a refund is appropriate. In such a situation, as shown in FIG. 3F, the unlock session pop-up window or screen 310 of FIG. 3B may be replaced with refund session pop-up window or screen 310' The refund session pop-up window or screen 310' differs from unlock session pop-up window or screen 310 of FIG. 3B in that it grays out the session code (in this case, "0800-BH02-0000-02WE-E820") displayed in session code field 315' (indicating that the "old" session code is no longer valid or that the "old" session has been killed, terminated, or deleted). The refund session pop-up window or screen 310' also displays a refund code (in this case, "WNEV-535E-TYX0-E9Q7-3580") in a refund code field 375. Similar to the unlock session pop-up window or screen 310, the refund session pop-up window or screen 310' displays a message to contact a communication device (in this case, calling a telephone number, "1-800-123-4567") displayed in contact information field 320' to refund the session. The refund session pop-up window or screen 310' also displays an alternative option to navigate to a collection of information (e.g., webpage, website, or web portal, or the like), by following a connection mechanism (e.g., URL, or the like) corresponding to the refund code (in this case, "https://crosslablicense-dev.agilent.com/LicensingWebClient/AceSession/Refund?SessionCode=0800BH02000002WEE820&RefundCode=WNEV535ETYX0E9Q73580") in connection mechanism field 380. Alternatively, or additionally, the refund session pop-up window or screen 310' displays a visual code 385 (in this case, a QR code corresponding to the connection mechanism (e.g., URL, or the like) displayed in connection mechanism field 380.

Once the refund code has been successfully entered via one of the methods described above, and the refund code has been verified, the user will be credited for the un-completed session (e.g., by crediting the counter by the predetermined number of credits per session use for the service associated with the un-completed session, etc.). In an example, an option to access the refund code may be available before a deliverable end to the single session use of the requested service using the software (e.g., generation of a qualification report in the case of qualification service being requested, or the like). Said option to access the refund code may be inactivated once the deliverable end to the single session use has occurred.

The process of license management and authentication of FIG. 3 might otherwise be similar, if not identical, to that described above with respect to operation of system 100 of FIG. 1 and/or method 200 of FIG. 2.

FIGS. 4A-4D (collectively, "FIG. 4") are flow diagrams illustrating a method 400 for implementing software licensing management and authentication, in accordance with various examples. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various examples. Moreover, while the method 400 illustrated by FIG. 4 can be implemented by or with (and, in an example, are described below with respect to) the systems, examples, or examples 100, 200, and 300 of FIGS. 1, 2, and 3, respectively (or components thereof), such methods may also be implemented using any suitable hardware (or software) implementation. Similarly, while each of the systems, examples, or examples 100, 200, and 300 of FIGS. 1, 2, and 3, respectively (or components thereof), can operate according to the method 400 illustrated by FIG. 4 (e.g., by executing instructions embodied on a computer readable medium), the systems, examples, or examples 100, 200, and 300 of FIGS. 1, 2, and 3 can each also operate according to other modes of operation and/or perform other suitable procedures.

In the non-limiting example of FIG. 4A, method 400, at block 405, might comprise receiving, by a client device on which a first software is executed, a request by a user to use a requested service using the first software. In some examples, the first software might be software that performs operations on the client device, without operating or controlling any external hardware or equipment. Alternatively, the first software might be software for operating or controlling equipment, which might include, without limitation, an atomic absorption ("AA") system, a capillary electrophoresis ("CE") system, a dissolution system, an optical emission spectrometry ("OES") system, an inductively coupled plasma ("ICP") OES system, a gas chromatography ("GC") system, a GC mass spectrometry ("MS") system, a gel permeation chromatography ("GPC") system, a mass spectrometer, an ICP-MS system, an infrared spectroscopy system, a Fourier Transform infrared ("FT-IR") spectroscopy system, a liquid chromatography ("LC") system, a LC-MS system, a microfluidics system, a sample preparation ("SP") system, a supercritical fluid chromatography ("SFC") system, an ultraviolet-visible ("UV-Vis") spectrophotometer, or other laboratory instrumentation, and/or the like. In an example, the client device might be one of a laboratory computer that communicates with and controls the equipment, a desktop computer that communicates with and controls the equipment, a laptop computer that communicates with and controls the equipment, a portable computing system that communicates with and controls the equipment, a mobile user device that that communicates with and controls the equipment, an external dedicated control device that communicates with and controls the equipment, or an integrated dedicated control device that controls the equipment, and/or the like.

At block 410, method 400 might comprise, in response to receiving the request, initiating, by the client device, authentication protocols of the first software. The initiated authentication protocols might cause the client device to generate a unique identifier associated with at least one of the requested service or the first software and to present a prompt to the user to request an unlock code using the generated unique identifier. According to some examples, method 400, at optional block 415, might comprise encoding the unique identifier. In an example, encoding the unique identifier might comprise encoding the unique identifier using one of a Base16 encoding scheme, a Base32 encoding scheme, a Base36 encoding scheme, a Base58 encoding scheme, or a Base64 encoding scheme, and/or the like.

Method 400 might further comprise, at block 420, receiving, by a computing system, a request for the unlock code. In an example, the request for the unlock code might comprise the generated unique identifier, and the generated unique identifier might comprise licensing information (that may be embedded within the generated first unique identifier). In an example, the computing system might include, without limitation, a local computing system that is local to the client device, a remote computing system that is located at a geographical location separate from the location of the client device and that is accessible over a network(s), a licensing server accessible over a network(s), and/or the like.

Method 400, at block 425, might further comprise, in response to receiving the generated unique identifier, determining, by the computing system, whether the user should have access to the requested service using the first software based at least in part on the licensing information embedded in the generated unique identifier. In an example, such determination might comprise extracting the licensing information embedded in the unique identifier. The computing system might then determine whether the user should have access to the requested service using the first software, based, at least in part on the licensing information and at least one of stored information regarding at least one of the user, an entity with which the user is associated, the requested service, or the first software, and/or the like. Alternatively, such determination might comprise first decrypting the unique identifier and extracting the licensing information embedded in the decrypted unique identifier. The computing system might then authenticate at least one of the unique identifier or the extracted licensing information embedded in the unique identifier. Once the at least one of the unique identifier or the extracted licensing information has been authenticated, the computing system might determine whether the user should have access to the requested service using the first software, based at least in part on the licensing information embedded in the unique identifier and based at least in part on stored information regarding at least one of the user, an entity with which the user is associated, the requested service, the first software, license to access to the requested service by the user or the entity, or license to access to the first software by the user or the entity, and/or the like.

Method 400 might comprise, based on a determination that the user should have access to the requested service using the first software, generating, by the computing system, an unlock code associated, with the requested service using the first software and deducting cost associated with the licensing information (block 430). In an example, the unlock code might be a per-session code for unlocking a single session use of the requested service using the first software. In an example, the unlock code might comprise embedded data, including, but not limited to, at least one of security-related data, data associated with the generated unique identifier, data regarding type of user, data regarding whether the user is under requirement of payment, session identification data, data regarding type of service requested, or data regarding type of hardware associated with the requested service, and/or the like. In an example, generating the unlock code associated with the requested service using the first software might comprise permutating the unique identifier in a predetermined manner and creating a hash-based message authentication code ("HMAC") using a cryptographic hash function comprising a secure hash algorithm ("SHA"). In an example, the secure hash algorithm might include, but is not limited to, one of a SHA-224 algorithm, a SHA-256 algorithm, a SHA-384 algorithm, a SHA-512 algorithm, a SHA-512/224 algorithm, or a SHA-512/256 algorithm, and/or the like. Method 400 might further comprise sending, by the computing system, the unlock code to the user (block 435).

At block 440, method 400 might comprise receiving, by the client device, the unlock code. Method 400 might further comprise, at block 445, in response to receiving the unlock code, verifying, by the client device, the unlock code. Method 400 might further comprise, in response to the unlock code being verified, unlocking, by the client device, the single session use of the requested service using the first software to allow the user to access the single session use of the requested service using the first software (block 450). Method 400 might continue onto the process at optional block 455 in FIG. 4B following the circular marker denoted, "A."

In some examples, the licensing information might include, without limitation, at least one of data regarding the requested service using the first software, session data for session use of the requested service, data regarding type of system for providing the requested service, information regarding type of license associated with at least one of the requested service or the first software, information regarding time that the generated unique identifier was generated, information regarding session information validation, information regarding cost corresponding to the license associated with at least one of the requested service or the first software, information regarding conditions associated with the license, information regarding limitations associated with the license, information regarding type of hardware associated with the first software, information regarding type of hardware associated with the requested service, or information regarding a session use of the requested service, and/or the like. The type of license might include, but is not limited to, one of a pay per use license, a period subscription license, a right to use license, or a free to use license, and/or the like. FIG. 4B depicts the case that the type of license of the first software is a pay per use license, where the pay per use license comprises a purchased or pre-purchased number of credits. In an example, the requested service among a plurality of available services costs a predetermined number of credits per session use.

In particular, at optional block 455 in FIG. 4B (following the circular marker denoted, "A"), method 400 might comprise, after generating the unlock code, decrementing, by the computing system, a counter indicating a remaining number of credits among the purchased or pre-purchased number of credits of a pay per use license by the predetermined number of credits per session use. The counter might be associated with the user or an entity (e.g., a company, an organization, etc.) with which the user is associated, or might be associated with an account of the user or the entity.

In the event that the user requests a refund (e.g., due to the requested service and/or the first software not being used after authentication protocols have commenced, due to the requested service and/or the first software not completing properly due to technical issues, or due to the user not completing, or not being able to complete, the licensed task, or the like), and the user successfully proves that a refund is appropriate, the user would be provided with a refund code from the service provider associated with at least one of the requested service or the first software and/or associated with the equipment. In such an example, method 400 might further comprise receiving, decrypting, and authenticating, by the computing system, the refund code from the user (optional block 460). Method 400 might further comprise, in response to receiving, decrypting, and authenticating the refund code, invalidating, by the computing system, the current single session use of the requested service using the first software, and incrementing, by the computing system, the counter indicating the remaining number of credits by the predetermined number of credits per session use for the requested service. (optional block 465). In an example, an option to access the refund code may be available before a deliverable end to the single session use of the requested service using the first software (e.g., generation of a qualification report in the case of qualification service being requested, or the like). Said option to access the refund code may be inactivated once the deliverable end to the single session use has occurred.

With reference to FIG. 4C, presenting the prompt to the user to request an unlock code using the generated unique identifier (at block 410) might comprise, at block 470, presenting two or more options that comprise displaying the generated unique identifier and a communication device for the user to use or contact and to provide (e.g., by speaking, by typing, by copying and, pasting, etc.) the generated unique identifier. The two or more options might further comprise displaying a connection mechanism to a collection of information, the connection mechanism (e.g. a link comprising a uniform resource locator ("URL"), or the like) including the generated unique identifier. The two or more options might further comprise displaying a visual code and a prompt for the user to scan the visual code, the visual code containing data associated with the generated unique identifier; and/or the like. In some examples, the visual code might include, without limitation, one of a bar code or a quick response ("QR") code, and/or the like.

At block 475, method 400 might further comprise prior to presenting the prompt to the user to request an unlock code using the generated unique identifier, determining, by the client device, whether the client device is connected to a communication network (e.g., the Internet or other network). Method 400 might further comprise, based on a determination that the client device is not connected to a communication network or has limited access to the communication network, graying out, by the client device, the option to display the connection mechanism to the collection of information (block 480).

Figure 4D:
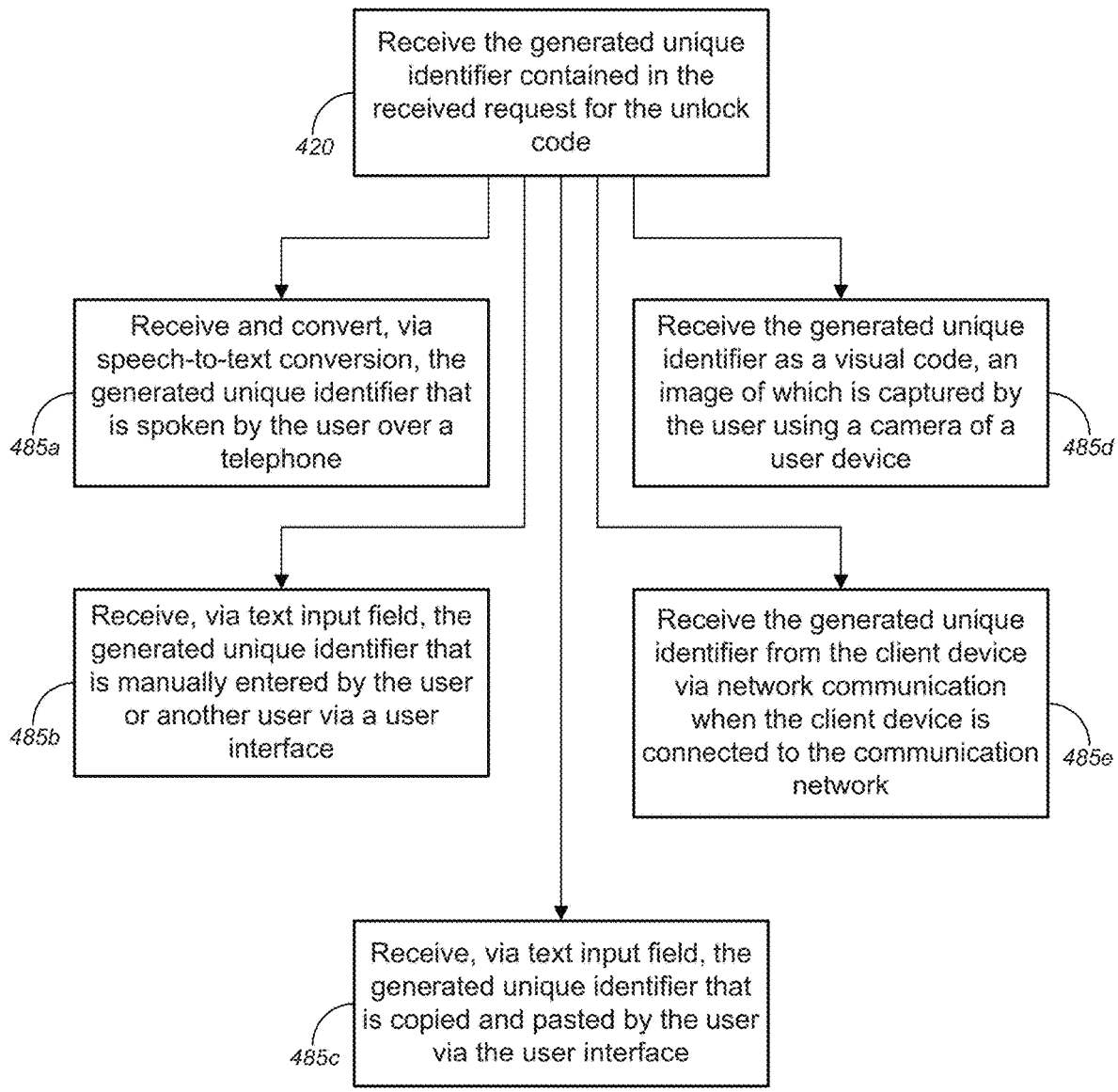

Turning to FIG. 4D, receiving the generated unique identifier contained in the received request for the unlock code (at block 420) might comprise one of: receiving and converting, via speech-to-text conversion, the generated unique identifier that is spoken by the user over a telephone (block 485a); receiving, via text input field, the generated unique identifier that is manually entered by the user or another user via a user interface (block 485b); receiving, via text input field, the generated unique identifier that is copied and pasted by the user via the user interface (block 485c); receiving the generated unique identifier as a visual code, an image of which is captured by the user using a camera of a user device (block 485d); or receiving the generated unique identifier from the client device via network communication when the client device is connected to the communication network (block 485e); and/or the like. According to some examples, the image of the visual code, when captured, might trigger one of sending the generated unique identifier to the computing system over a network or accessing a collection of information (e.g., a webpage, website, or web portal, or the like) that allows the user to manually enter the generated unique identifier, and/or the like.

Figure 5A:
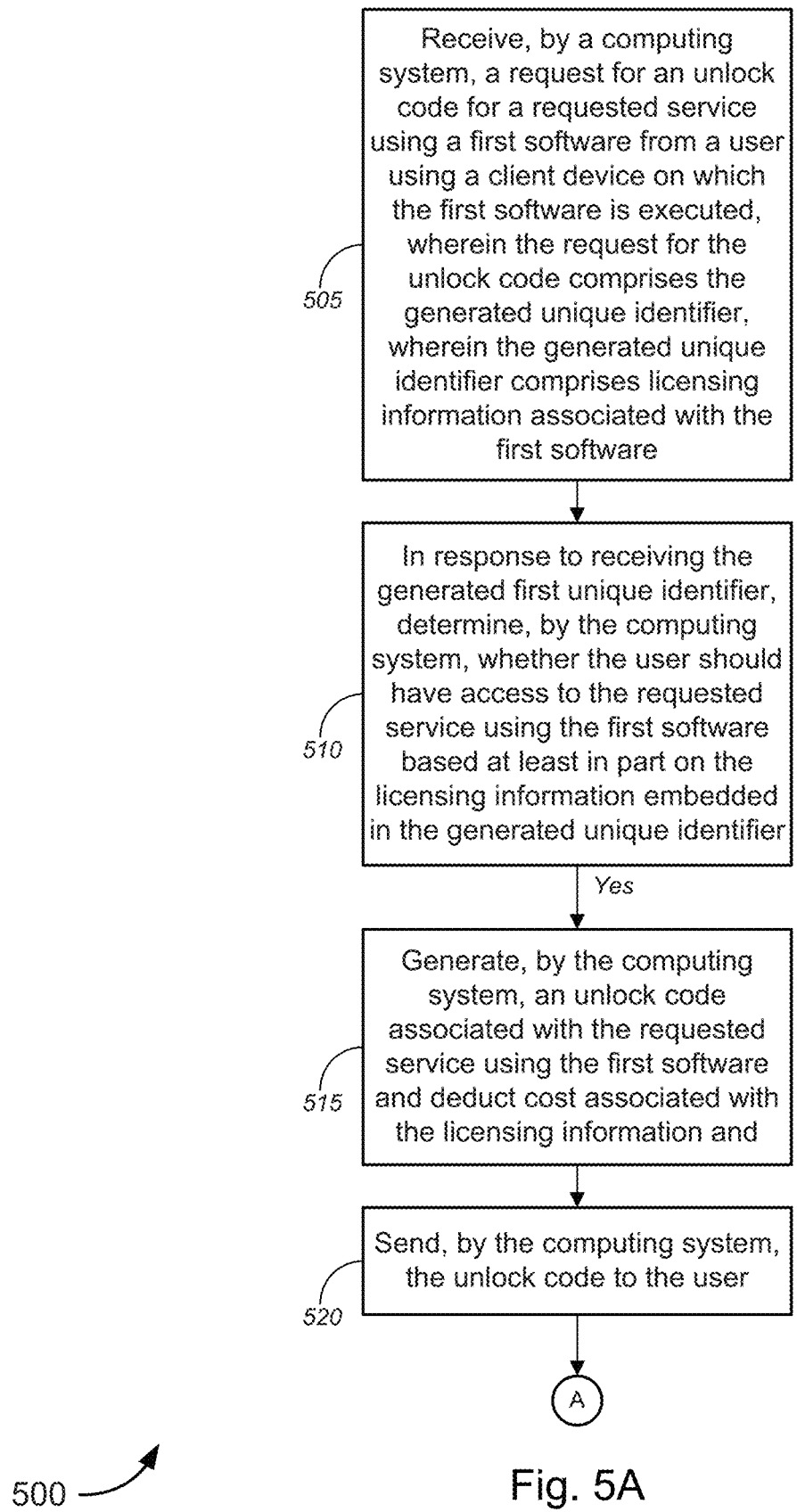
FIGS. 5A-5C are flow diagrams illustrating a method for implementing software licensing management and authentication from the perspective of a computing system or license server, in accordance with various examples.
Figure 5B:
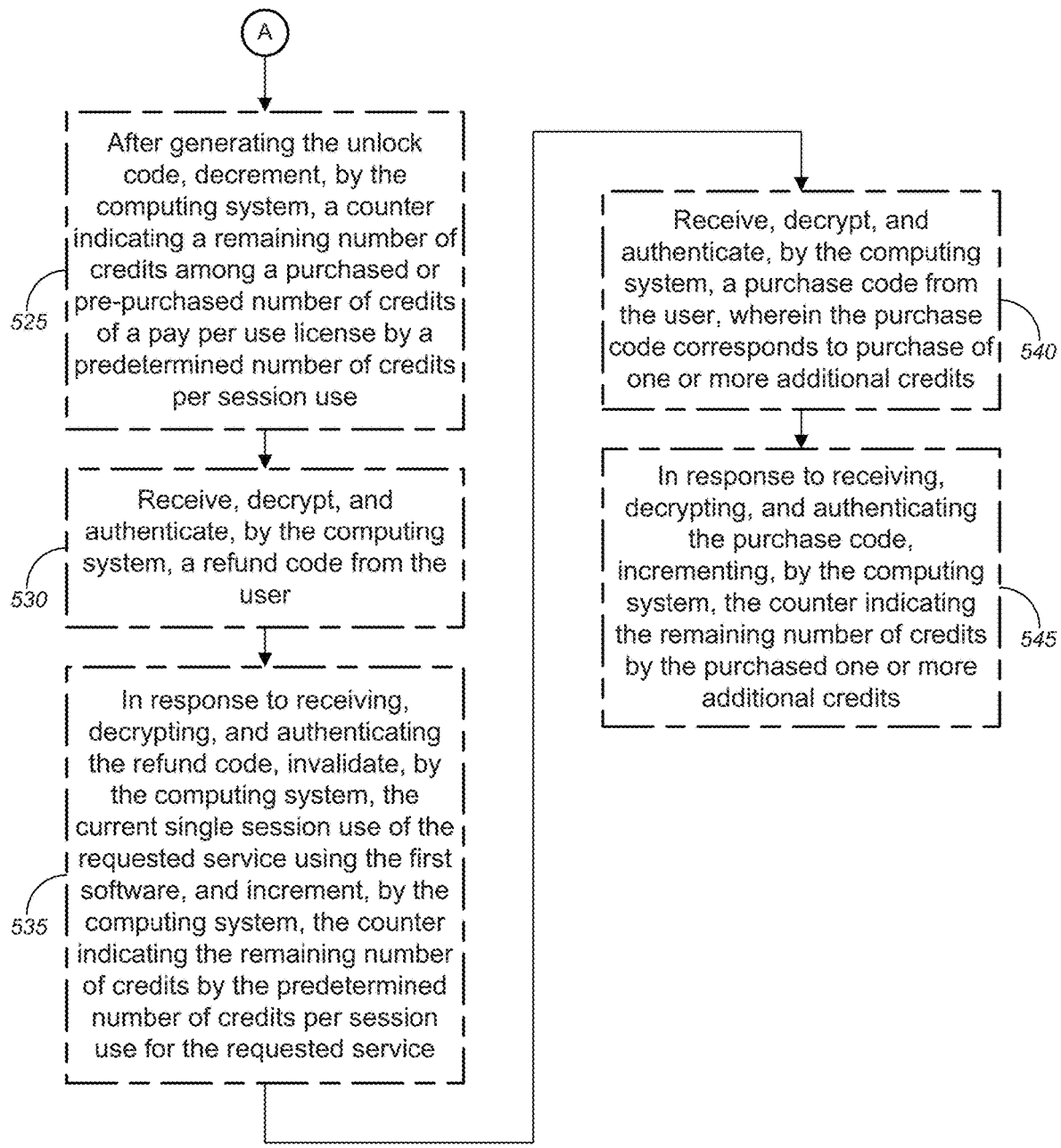
Figure 5C:
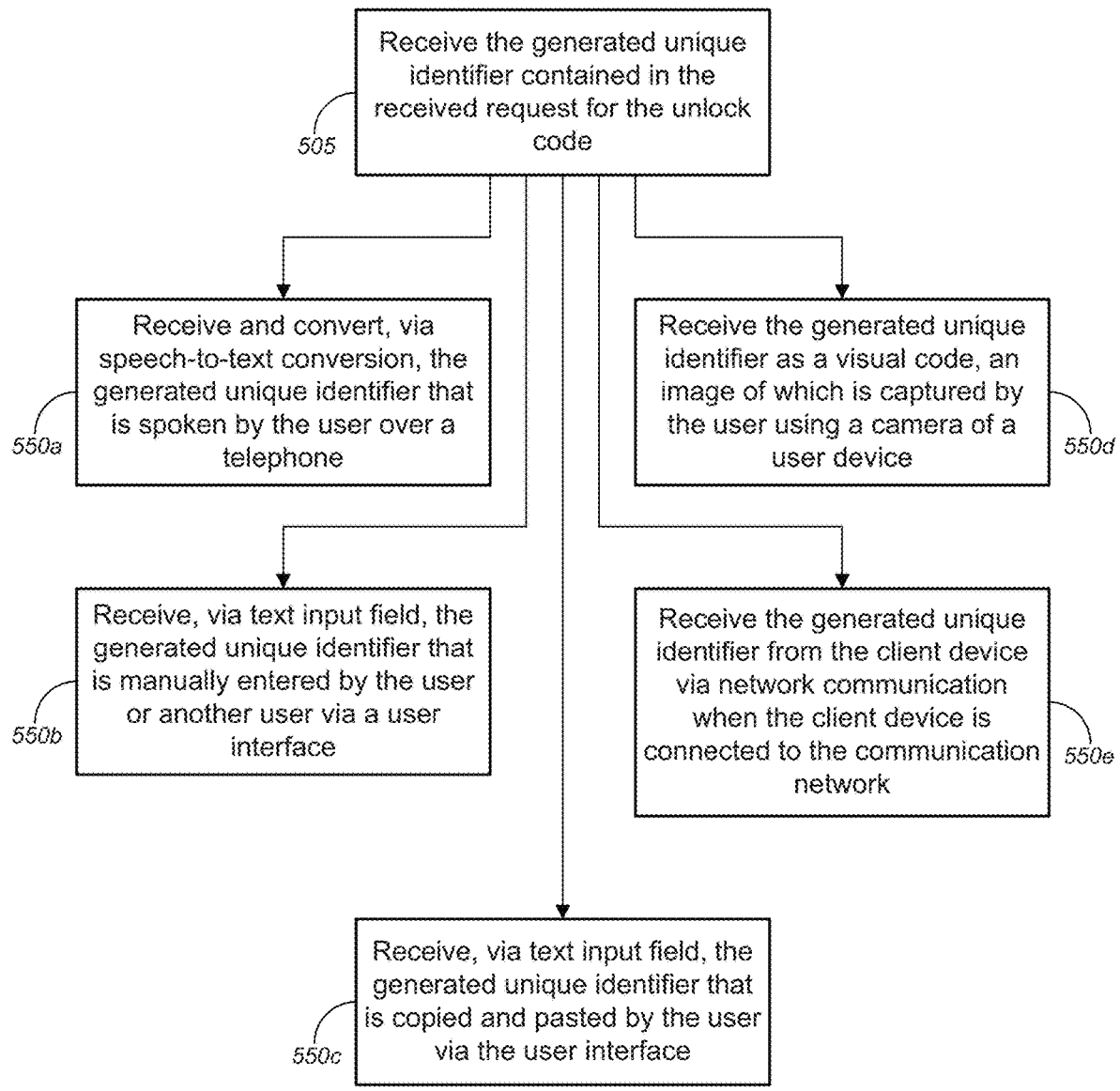

FIGS. 5A-5C (collectively, "FIG. 5") are flow diagrams illustrating a method for implementing software licensing management and authentication from the perspective of a computing system or license server, in accordance with various examples. Method 500 of FIG. 5A continues onto FIG. 5B following the circular marker denoted, "A."

While the techniques and procedures are depicted and/or described in a certain order for purposes of illustration, it should be appreciated that certain procedures may be reordered and/or omitted within the scope of various examples. Moreover, while the method 500 illustrated by FIG. 5 can be implemented by or with (and, in an example, are described below with respect to) the systems, examples, or examples 100, 200, and 300 of FIGS. 1, 2, and 3, respectively (or components thereof), such methods may also be implemented using any suitable hardware (or software) implementation. Similarly, while each of the systems, examples, or examples 100, 200, and 300 of FIGS. 1, 2, and 3, respectively (or components thereof), can operate according to the method 500 illustrated by FIG. 5 (e.g., by executing instructions embodied on a computer readable medium), the systems, examples, or examples 100, 200, and 300 of FIGS. 1, 2, and 3 can each also operate according to other modes of operation and/or perform other suitable procedures.

In the non-limiting example of FIG. 5A, method 500, at block 505, might comprise receiving, by a computing system, a request for an unlock code for a requested service using a first software from a user using a client device on which the first software is executed. In an example, the request for the unlock code might comprise the generated unique identifier, and the generated unique identifier might comprise licensing information (that may be embedded within the generated first unique identifier). In an example, the computing system might include, without limitation, a local computing system that is local to the client device, a remote computing system that is located at a geographical location separate from the location of the client device and that is accessible over a network(s), a licensing server accessible over a network(s), and/or the like.

In some examples, the first software might be software that performs operations on the client device, without operating or controlling any external hardware or equipment. Alternatively, the first software might be software for operating or controlling equipment, which might include, without limitation, an atomic absorption ("AA") system, a capillary electrophoresis ("CE") system, a dissolution system, an optical emission spectrometry ("OES") system, an inductively coupled plasma ("ICP") OES system, a gas chromatography ("GC") system, a GC mass spectrometry ("MS") system, a gel permeation chromatography ("GPC") system, a mass spectrometer, an ICP-MS system, an infrared spectroscopy system, a Fourier Transform infrared ("FT-IR") spectroscopy system, a liquid chromatography ("LC") system, a LC-MS system, a microfluidics system, a sample preparation ("SP") system, a supercritical fluid chromatography ("SFC") system, an ultraviolet-visible ("UV-Vis") spectrophotometer, or other laboratory instrumentation, and/or the like. In an example, the client device might be one of a laboratory computer that communicates with and controls the equipment, a desktop computer that communicates with and controls the equipment, a laptop computer that communicates with and controls the equipment, a portable computing system that communicates with and controls the equipment, a mobile user device that that communicates with and controls the equipment, an external dedicated control device that communicates with and controls the equipment, or an integrated dedicated control device that controls the equipment, and/or the like.

At block 510, method 500 might comprise, in response to receiving the generated unique identifier, determining, by the computing system, whether the user should have access to the requested service using the first software based at least in part on the licensing information embedded in the generated unique identifier. In an example, such determination might comprise extracting the licensing information embedded in the unique identifier. The computing system might then determine whether the user should have access to the requested service using the first software, based at least in part on the licensing information and at least one of stored information regarding at least one of the user, an entity with which the user is associated, the requested service, or the first software, and/or the like. Alternatively, such determination might comprise first decrypting the unique identifier and extracting the licensing information embedded in the decrypted unique identifier. The computing system might then authenticate at least one of the unique identifier or the extracted licensing information embedded in the unique identifier. Once the at least one of the unique identifier or the extracted licensing information has been authenticated, the computing system might determine whether the user should, have access to the requested service using the first software, based at least in part on the licensing information embedded in the unique identifier and based at least in part on stored information regarding at least one of the user, an entity with which the user is associated, the requested service, the first software, license to access to the requested service by the user or the entity, or license to access to the first software by the user or the entity, and/or the like.

According to some examples, method 500, at optional block 515, might comprise based on a determination that the user should have access to the requested service using the first software, generating, by the computing system, an unlock code associated with the requested service using the first software and deducting cost associated with the licensing information. In an example, the unlock code might be a per-session code for unlocking a single session use of the requested, service using the first software. In an example, the unlock code might comprise embedded data, including, but not limited to, at least one of security-related data, data associated, with the generated unique identifier, data regarding type of user, data regarding whether the user is under requirement of payment, session identification data, data regarding type of service requested, or data regarding type of hardware associated with the requested service, and/or the like. In an example, generating the unlock code associated with the requested service using the first software might comprise permutating the unique identifier in a predetermined manner and creating a hash-based message authentication code ("HMAC") using a cryptographic hash function comprising a secure hash algorithm ("SHA"). In an example, the secure hash algorithm might include, but is not limited to, one of a SHA-224 algorithm, a SHA-256 algorithm, a SHA-384 algorithm, a SHA-512 algorithm, a SHA-512/224 algorithm, or a SHA-512/256 algorithm, and/or the like. Method 500 might further comprise sending, by the computing system, the unlock code to the user (block 520). Method 500 might continue onto the process at optional block 525 in FIG. 5B following the circular marker denoted, "A."

In some examples, the licensing information might include, without limitation, at least one of data regarding the requested service using the first software, session data for session use of the requested service, data regarding type of system for providing the requested service, information regarding type of license associated with at least one of the requested service or the first software, information regarding time that the generated unique identifier was generated, information regarding session information validation, information regarding cost corresponding to the license associated with at least one of the requested service or the first software, information regarding conditions associated with the license, information regarding limitations associated with the license, information regarding type of hardware associated with the first software, information regarding type of hardware associated with the requested service, or information regarding a session use of the requested service, and/or the like. The type of license might include, but is not limited to, one of a pay per use license, a period subscription license, a right to use license, or a free to use license, and/or the like. FIG. 5B depicts the case that the type of license of the first software is a pay per use license, where the pay per use license comprises a purchased or pre-purchased number of credits. In an example, the requested service among a plurality of available services costs a predetermined number of credits per session use.

In particular, at optional block 525 in FIG. 55B (following the circular marker denoted, "A"), method 500 might comprise, after generating the unlock code, decrementing, by the computing system, a counter indicating a remaining number of credits among the purchased or pre-purchased number of credits of a pay per use license by the predetermined number of credits per session use. The counter might be associated with the user or an entity (e.g., a company, an organization, etc.) with which the user is associated, or might be associated with an account of the user or the entity.

In the event that the user requests a refund (e.g., due to the requested service and/or the first software not being used, after authentication protocols have commenced, due to the requested service and/or the first software not completing properly due to technical issues, or due to the user not completing, or not being able to complete, the licensed task, or the like), and the user successfully proves that a refund is appropriate, the user would be provided with a refund code from the service provider associated with at least one of the requested service or the first software and/or associated with the equipment. In such an example, method 500 might further comprise receiving, decrypting, and authenticating, by the computing system, the refund code from the user (optional block 530). Method 500 might further comprise, in response to receiving, decrypting, and authenticating the refund code, invalidating, by the computing system, the current single session use of the requested service using the first software, and incrementing, by the computing System, the counter indicating the remaining number of credits by the predetermined number of credits per session use for the requested service. (optional block 535). In an example, an option to access the refund code may be available before a deliverable end to the single session use of the requested service using the first software (e.g., generation of a qualification report in the case of qualification service being requested, or the like). Said option to access the refund code may be inactivated once the deliverable end to the single session use has occurred.

Method 500 might further comprise, at block 540, receiving, decrypting, and authenticating, by the computing system, a purchase code from the user, wherein the purchase code corresponds to purchase of one or more additional credits. Method 500, at block 545, might further comprise, in response to receiving, decrypting, and authenticating the purchase code, incrementing, by the computing system, the counter indicating the remaining number of credits by the purchased one or more additional credits. In an example, the user might pay to use requested services by making a purchase order for a number of credits, where the total number of credits purchased might be based on the number of services that the user intends to consume multiplied by the cost of using the services (in terms of the number of credits per use of the service). In this way, the user would have a bank of credits on the computing system (e.g., on a license server, or the like). In an example, at least one of the purchased or pre-purchased number of credits, the remaining number of credits, or the one or more additional credits are assignable to at least one of an entity associated with the pay per use license, an account associated with the entity, or one or more individuals associated with the entity, or the like. Although the various examples are described with respect to the purchase of credits that represent the cost for using requested services, the various examples are not so limited, and can be considered in terms of the user making a payment, the system allowing the user to consume a service or commodity (in a manner as described in detail herein or the like), and the user deriving some value based on the consumption of the service or commodity. In other words, whether the user purchases credits or some other value-based construct, the user may only be able to consume the service or commodity by the method described herein involving the asynchronous bi-directional authentication (or handshake) using the unique identifier that includes (or embeds therein) licensing information (e.g., data regarding the requested service, session data for session use of the requested service, data regarding type of system for providing the requested service, information regarding type of license associated with at least one of the requested service or the first software, and/or the like) and the corresponding unlock code that is unique to the unique identifier and unique to the requested service or commodity.

With reference to FIG. 5C, receiving the generated unique identifier contained in the received request for the unlock code (at block 505) might comprise one of: receiving and converting, via speech-to-text conversion, the generated unique identifier that is spoken by the user over a telephone (block 550a); receiving, via text input field, the generated unique identifier that is manually entered by the user or another user via a user interface (block 550b); receiving, via text input field, the generated unique identifier that is copied and pasted by the user via the user interface (block 550c); receiving the generated unique identifier as a visual code, an image of which is captured by the user using a camera of a user device (block 550d); or receiving the generated unique identifier from the client device via network communication when the client device is connected to the communication network (block 550e); and/or the like. According to some examples, the image of the visual code, when captured, might trigger one of sending the generated unique identifier to the computing system over a network or accessing a collection of information (e.g., a webpage, website, or web portal, or the like) that allows the user to manually enter the generated unique identifier, and/or the like.

Figure 6A:
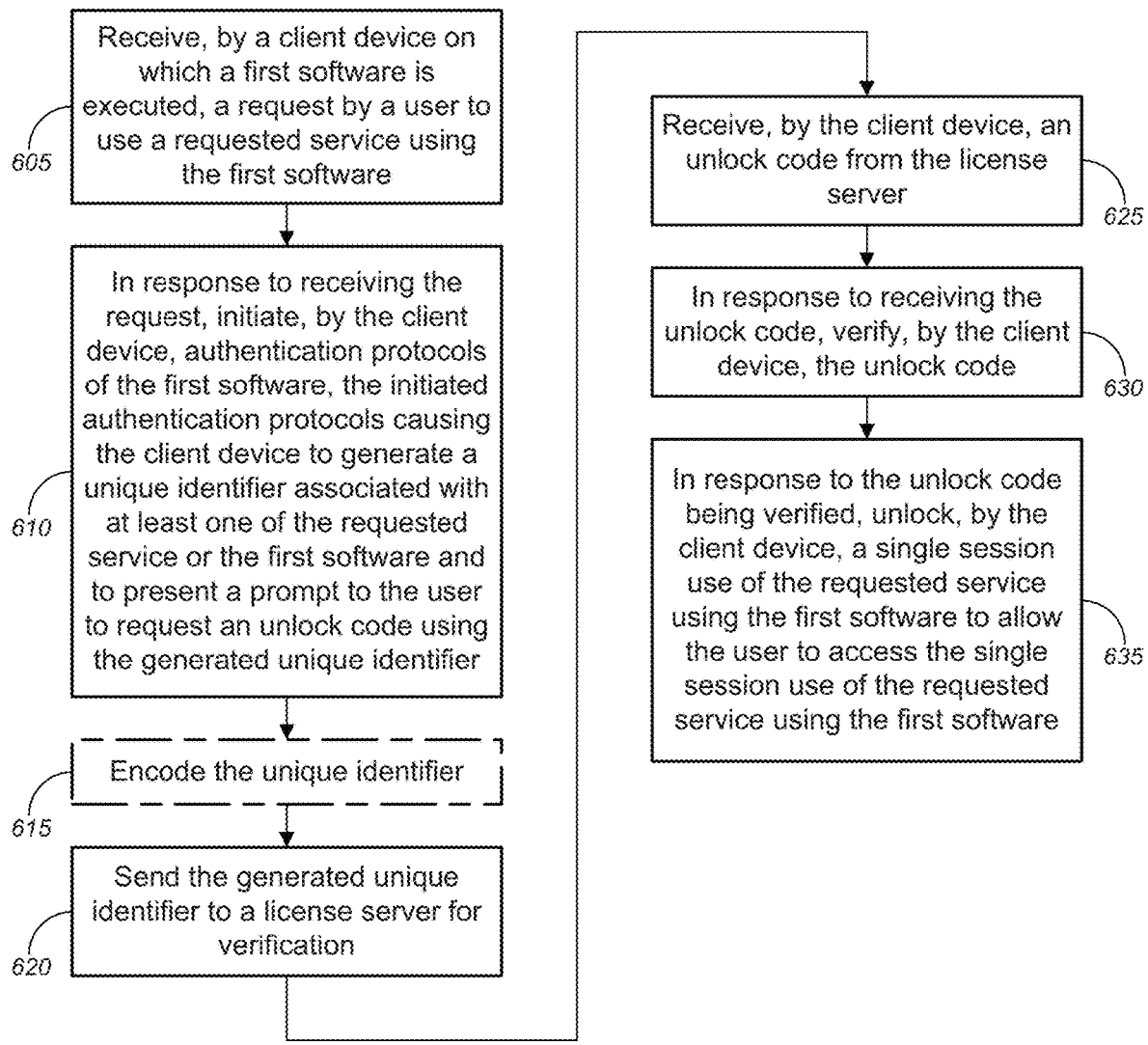
FIGS. 6A-6C are flow diagrams illustrating a method for implementing software licensing management and authentication from the perspective of a client device, in accordance with various examples.
Figure 6B:
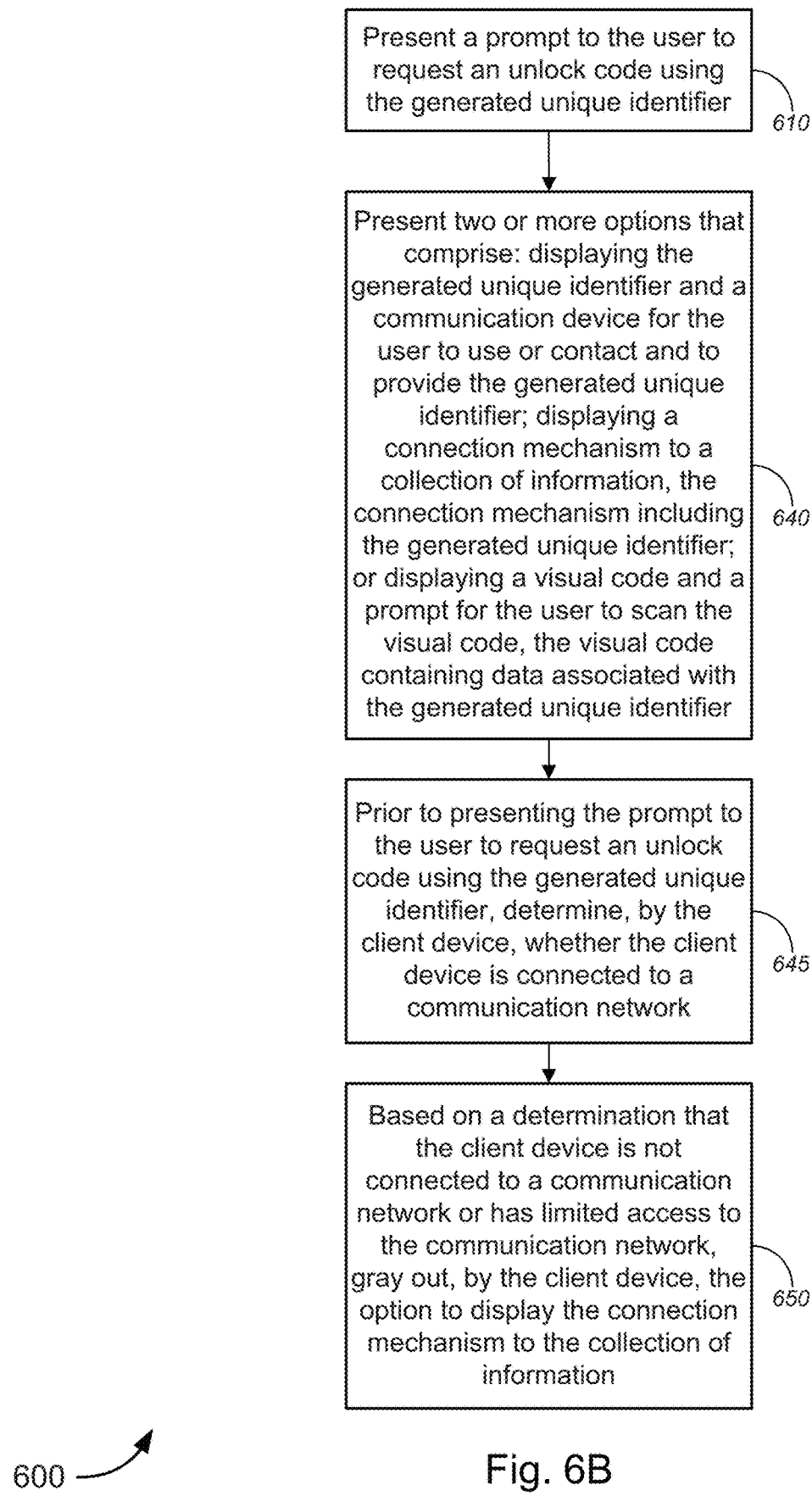
Figure 6C:
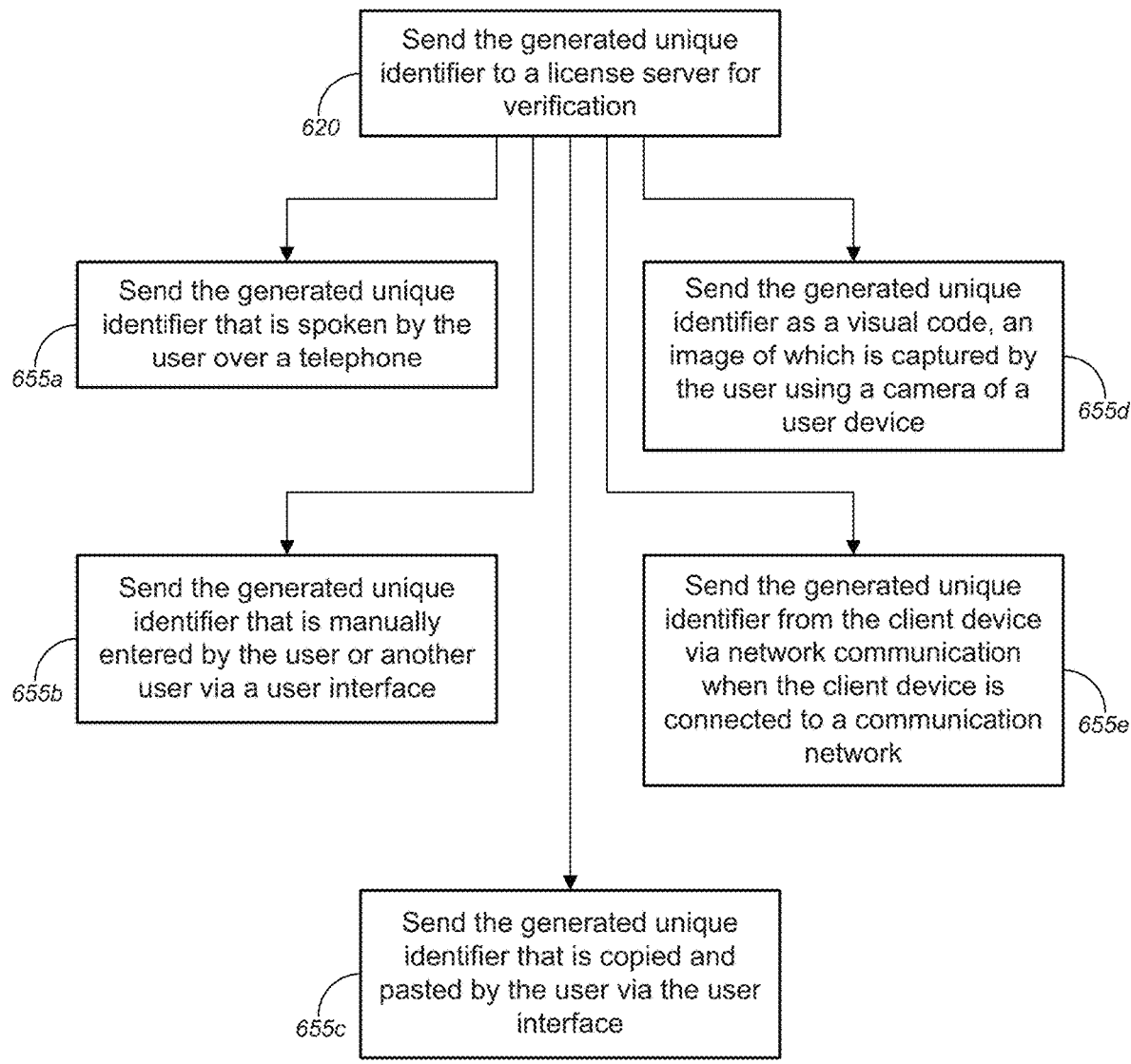

FIGS. 6A-6C (collectively, "FIG. 6") are flow diagrams illustrating a method for implementing software licensing management and authentication from the perspective of a client device, in accordance with various examples.

While the techniques and procedures are depicted and/or described in a certain order for purposes of illustration, it should be appreciated that certain procedures may be reordered and/or omitted within the scope of various examples. Moreover, while the method 600 illustrated by FIG. 6 can be implemented by or with (and, in an example, are described below with respect to) the systems, examples, or examples 100, 200, and 300 of FIGS. 1, 2, and 3, respectively (or components thereof), such methods may also be implemented using any suitable hardware (or software) implementation. Similarly, while each of the systems, examples, or examples 100, 200, and 300 of FIGS. 1, 2, and 3, respectively (or components thereof), can operate according to the method 600 illustrated by FIG. 6 (e.g., by executing instructions embodied on a computer readable medium), the systems, examples, or examples 100, 200, and 300 of FIGS. 1, 2, and 3 can each also operate according to other modes of operation and/or perform other suitable procedures.

In the non-limiting example of FIG. 6A, method 600, at block 605, might comprise receiving, by a client device on which a first software is executed, a request by a user to use a requested service using the first software. In some examples, the first software might be software that performs operations on the client device, without operating or controlling any external hardware or equipment. Alternatively, the first software might be software for operating or controlling equipment, which might include, without limitation, an atomic absorption ("AA") system, a capillary electrophoresis ("CE") system, a dissolution system, an optical emission spectrometry ("OES") system, an inductively coupled plasma ("ICP") OES system, a gas chromatography ("GC") system, a GC mass spectrometry ("MS") system, a gel permeation chromatography ("GPC") system, a mass spectrometer, an ICP-MS system, an infrared spectroscopy system, a Fourier Transform infrared ("FT-IR") spectroscopy system, a liquid chromatography ("LC") system, a LC-MS system, a microfluidics system, a sample preparation ("SP") system, a supercritical fluid chromatography ("SFC") system, an ultraviolet-visible ("UV-Vis") spectrophotometer, or other laboratory instrumentation, and/or the like. In an example, the client device might be one of a laboratory computer that communicates with and controls the equipment, a desktop computer that communicates with and controls the equipment, a laptop computer that communicates with and controls the equipment, a portable computing system that communicates with and controls the equipment, a mobile user device that that communicates with and controls the equipment, an external dedicated control device that communicates with and controls the equipment, or an integrated dedicated control device that controls the equipment, and/or the like.

At block 610, method 600 might comprise, in response to receiving the request, initiating, by the client device, authentication protocols of the first software. The initiated authentication protocols might cause the client device to generate a unique identifier associated with at least one of the requested service or the first software and to present a prompt to the user to request an unlock code using the generated unique identifier. In an example, the generated unique identifier might comprise licensing information.

In some examples, the licensing information might include, without limitation, at least one of data regarding the requested service using the first software, session data for session use of the requested service, data regarding type of system for providing the requested service, information regarding type of license associated with at least one of the requested service or the first software, information regarding time that the generated unique identifier was generated, information regarding session information validation, information regarding cost corresponding to the license associated with at least one of the requested service or the first software, information regarding conditions associated with the license, information regarding limitations associated with the license, information regarding type of hardware associated with the first software, information regarding type of hardware associated with the requested service, or information regarding a session use of the requested service, and/or the like. The type of license might include, but is not limited to, one of a pay per use license, a period subscription license, a right to use license, or a free to use license, and/or the like. In an example, the pay per use license might comprise a purchased or pre-purchased number of uses. In an example, the requested service among a plurality of available services might cost a predetermined number of credits per session use.

According to some examples, method 600, at optional block 615, might comprise encoding the unique identifier. In an example, encoding the unique identifier might comprise encoding the unique identifier using one of a Base16 encoding scheme, a Base32 encoding scheme, a Base36 encoding scheme, a Base58 encoding scheme, or a Base64 encoding scheme, and/or the like. Method 600 might further comprise sending the generated unique identifier to a license server for verification (block 620).

Method 600 might further comprise, at block 625, receiving, by the client device, an unlock code from the license server. In an example, the unlock code might be a per-session code for unlocking a single session use of the requested service using the first software. In an example, the unlock code might comprise embedded data, including, but not limited to, at least one of security-related data, data associated with the generated unique identifier, data regarding type of user, data regarding whether the user is under requirement of payment, session identification data, data regarding type of service requested, or data regarding type of hardware associated with the requested service, and/or the like. In an example, the unlock code associated with the requested service using the first software might be generated by permutating the unique identifier in a predetermined manner and creating a hash-based message authentication code ("HMAC") using a cryptographic hash function comprising a secure hash algorithm ("SHA"). In an example, the secure hash algorithm might include, but is not limited to, one of a SHA-224 algorithm, a SHA-256 algorithm, a SHA-384 algorithm, a SHA-512 algorithm, a SHA-512/224 algorithm, or a SHA-512/256 algorithm, and/or the like.

At block 630, method 600 might comprise, in response to receiving the unlock code, verifying, by the client device, the unlock code. Method 600 might further comprise, in response to the unlock code being verified, unlocking, by the client device, the single session use of the requested service using the first software to allow the user to access the single session use of the requested service using the first software (block 635).

With reference to FIG. 613, presenting the prompt to the user to request an unlock code using the generated unique identifier (at block 610) might comprise, at block 640, presenting two or more options that comprise displaying the generated unique identifier and a communication device for the user to use or contact and to provide (e.g., by speaking, by typing, by copying and pasting, etc.) the generated unique identifier. The two or more options might further comprise displaying a connection mechanism to a collection of information, the connection mechanism (e.g., a link comprising a uniform resource locator ("URL"), or the like) including the generated unique identifier. The two or more options might further comprise displaying a visual code and a prompt for the user to scan the visual code, the visual code containing data associated with the generated unique identifier; and/or the like. In some examples, the visual code might include, without limitation, one of a bar code or a quick response ("QR") code, and/or the like.

At block 645, method 600 might further comprise prior to presenting the prompt to the user to request an unlock code using the generated unique identifier, determining, by the client device, whether the client device is connected to a communication network (e.g., the Internet or other network). Method 600 might further comprise, based on a determination that the client device is not connected to a communication network or has limited access to the communication network, graying out, by the client device, the option to display the connection mechanism to the collection of information (block 650).

Turning to FIG. 6C, sending the generated unique identifier to the license server for verification (at block 620) might comprise one of: sending the generated unique identifier that is spoken by the user over a telephone (block 655a); sending the generated unique identifier that is manually entered by the user or another user via a user interface (block 655b); sending the generated unique identifier that is copied and pasted by the user via the user interface (block 655c); sending the generated unique identifier as a visual code, an image of which is captured by the user using a camera of a user device (block 655d); or sending the generated unique identifier from the client device via network communication when the client device is connected to the communication network (block 655e); and/or the like. According to some examples, the image of the visual code, when captured, might trigger one of sending the generated unique identifier to the computing system over a network or accessing a collection of information (e.g., a webpage, website, or web portal, or the like) that allows the user to manually enter the generated unique identifier, and/or the like.

Exemplary System and Hardware Implementation

Figure 7:
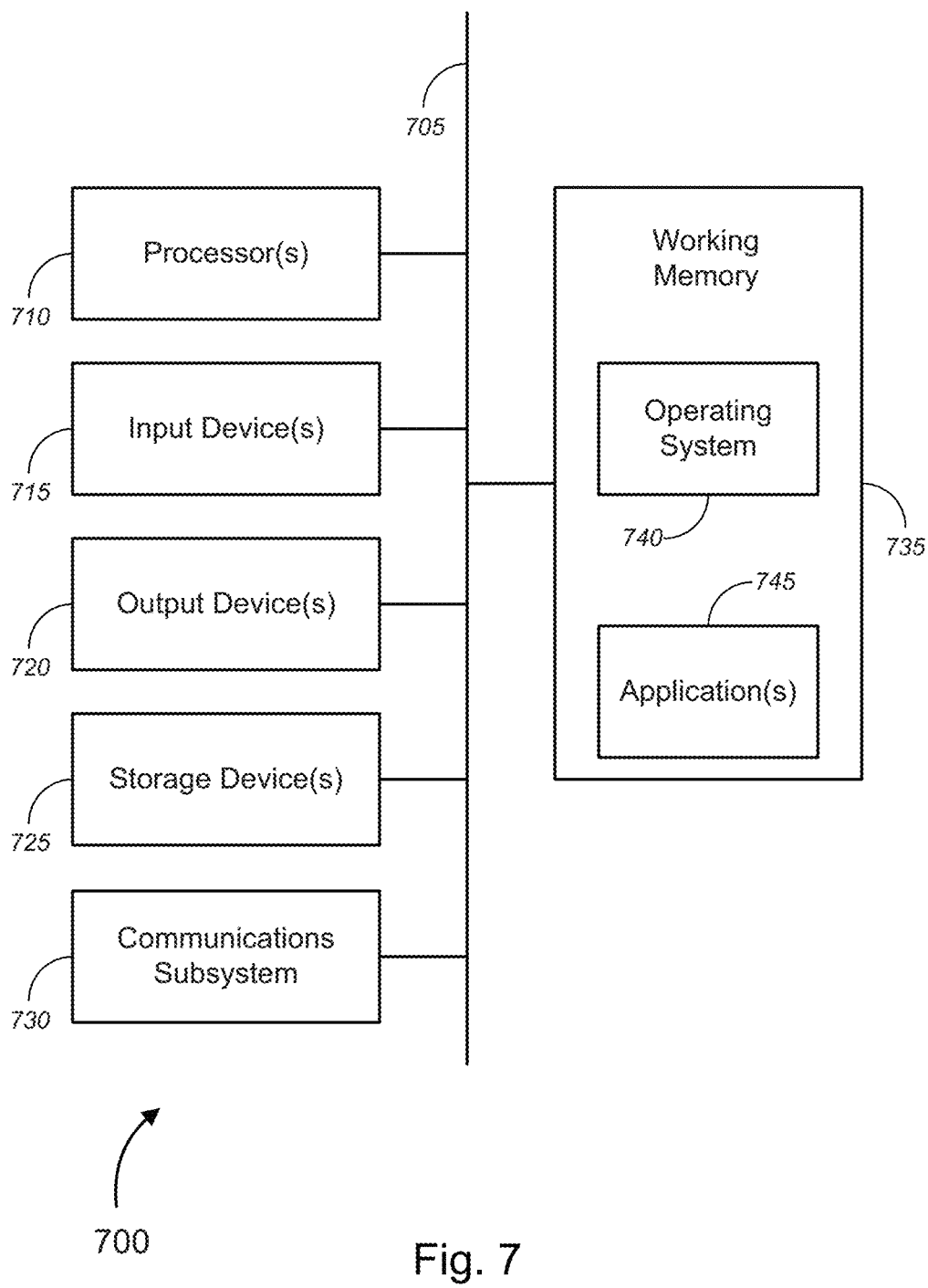
FIG. 7 is a block diagram illustrating an exemplary computer or system hardware architecture, in accordance with various examples.

FIG. 7 is a block diagram illustrating an exemplary computer or system hardware architecture, in accordance with various examples. FIG. 7 provides a schematic illustration of one example of a computer system 700 of the service provider system hardware that can perform the methods provided by various other examples, as described herein, and/or can perform the functions of computer or hardware system (i.e., client devices 105 and 205, equipment 110, computing systems 120a and 120b, user devices 135 and 235, license servers 140 and 240, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an example of the computer or hardware system (i.e., client devices 105 and 205, equipment 110, computing systems 120a and 120b, user devices 135 and 235, license servers 140 and 240, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many examples, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various examples (including, without limitation, hypervisors, VMs, and the like), and/or may be designed to implement methods, and/or configure systems, provided by other examples, as described herein. Merely by way of example, one or more procedures described with respect to the method(s) discussed above might be implemented as code and/or instructions executable by a computer (and/or a processor within a computer). In an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In an example, the storage medium might be incorporated within a computer system, such as the system 700. In other examples, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some examples may employ a computer or hardware system (such as the computer or hardware system 700) to perform methods in accordance with various examples of the invention. According to a set of examples, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an example implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some examples, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative examples, a computer readable medium may take the form of transmission media, which includes, without limitation, coaxial cables, copper wire, and fiber optics, including the wires that comprise the bus 705, as well as the various components of the communication subsystem 730 (and/or the media by which the communications subsystem 730 provides communication with other devices). In an alternative set of examples, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various examples of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
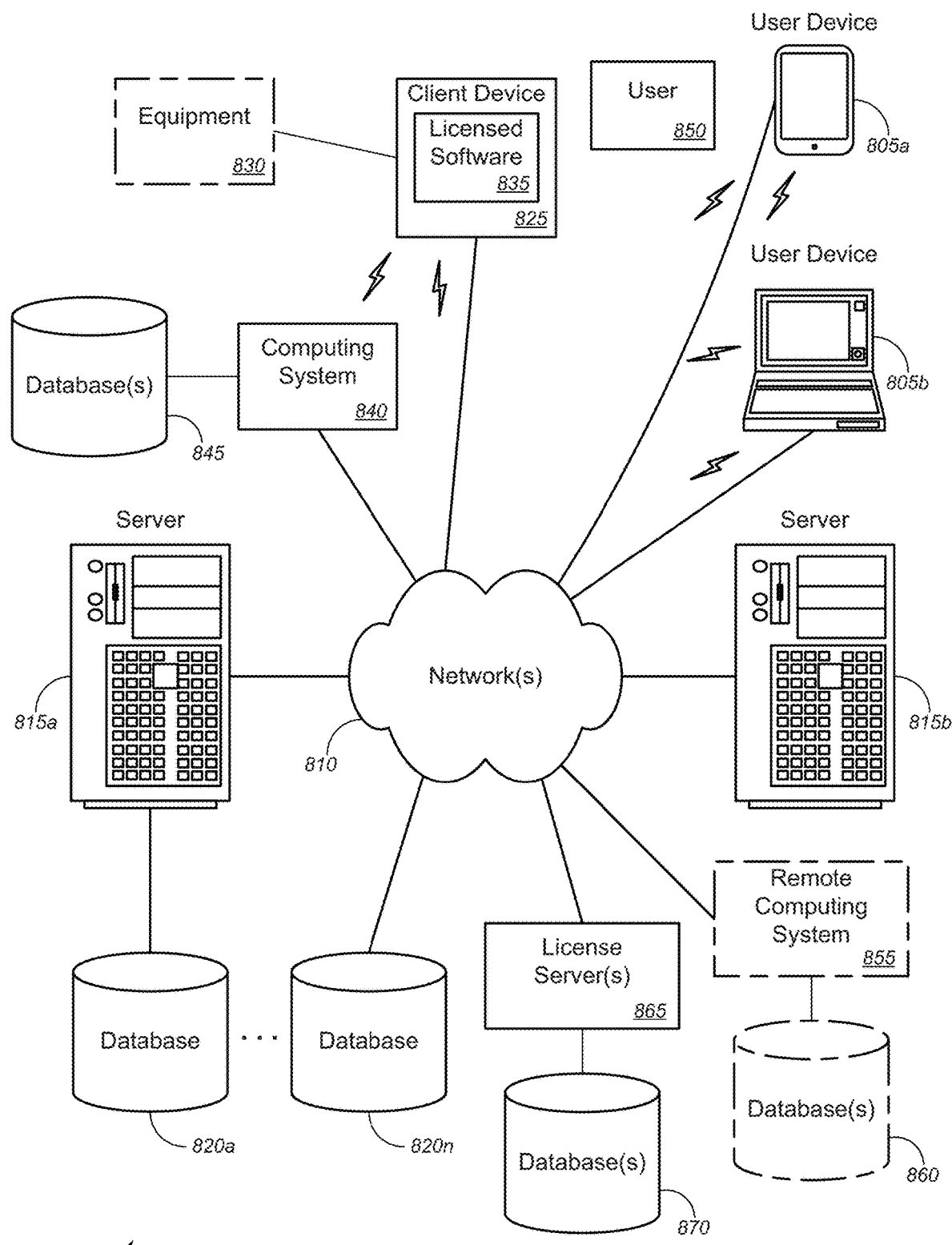
FIG. 8 is a block diagram illustrating a networked system of computers, computing systems, or system hardware architecture, which can be used in accordance with various examples.

As noted above, a set of examples comprises methods and systems for implementing software licensing management and authentication, and, more particularly, to methods, systems, and apparatuses for implementing software licensing management and authentication regardless of whether a client device associated with a potential licensee is connected with a communication network (e.g., the Internet or other network). FIG. 8 illustrates a schematic diagram of a system 800 that can be used in accordance with one set of examples. The system 800 can include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various examples (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain examples operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 810 (similar to network(s) 150 or 250 of FIGS. 1 and 2, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular example, the network might include an access network of the service provider (e.g., an Internet service provider ("ISP")). In another example, the network might include a core network of the service provider, and/or the Internet.

Embodiments can also include one or more server computers 815a or 815b (collectively, "servers 815" or "server computers 815" or the like). Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some examples of the invention, the web server may be configured to serve web pages that can be operated within a web browser on one or more of the user computers 805 to perform methods of the invention.

The server computers 815, in some examples, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in an example, be configured, to perform methods provided by various examples). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, SybaseT™, IBM™, and the like, which can process requests from clients (including, depending on the configuration, dedicated database clients, API clients, web browsers, etc.) running on a user computer, user device, or customer device 805 and/or another server 815. In some examples, an application server can perform one or more of the processes for implementing software licensing management and authentication, and, more particularly, to methods, systems, and apparatuses for implementing software licensing management and authentication regardless of whether a client device associated with a potential licensee is connected with a communication network (e.g., the Internet or other network), as described in detail above. Data provided by an application server may be formatted as one or more web pages (comprising HTML, JavaScript, etc., for example) and/or may be forwarded to a user computer 805 via a web server (as described above, for example), Similarly, a web server might receive web page requests and/or input data from a user computer 805 and/or forward the web page requests and/or input data to an application server. In an example, a web server may be integrated with an application server.

In accordance with further examples, one or more servers 815 can function as a file server and/or can include one or more of the files (e.g., application code, data files, etc.) necessary to implement various disclosed methods, incorporated by an application running on a user computer 805 and/or another server 815, Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain examples, the system can include one or more databases 820a-820n (collectively, "databases 820"). The location of each of the databases 820 is discretionary: merely by way of example, a database 820a might reside on a storage medium local to (and/or resident in) a server 815a (and/or a user computer, user device, or customer device 805). Alternatively, a database 820n can be remote from any or all of the computers 805, 815, so long as it can be in communication (e.g., via the network 810) with one or more of these. In a particular set of examples, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of examples, the database 820 can be a relational database, such as an Oracle database, that is adapted to store, update, and retrieve data in response to SQL-formatted commands. The database might be controlled and/or maintained by a database server, as described above, for example.

According to some examples, system 800 might further comprise a client device 825 (similar to client devices 105 and 205 of FIGS. 1 and 2, or the like), equipment 830 (optional; similar to equipment 110 of FIG. 1, or the like), first software or licensed software 835 running on client device 825 (similar to licensed software 115 or 215 of FIGS. 1 and 2, or the like), computing system 840 and corresponding database(s) 845 (similar to computing systems 120a and corresponding database(s) 125a of FIG. 1, or the like), and remote computing system 855 and corresponding database(s) 860 (optional; similar to remote computing systems 120b and corresponding database(s) 125b of FIG. 1, or the like). Each of the client device 825 and/or the user device 805a or 805b might communicatively couple to the computing system 840 via wired communication (depicted in FIG. 8 by the lines between the client device 825 and the computing system 840 via network(s) 810 or the lines between each user device 805a or 805b and the computing system 840 via network(s) 810) or via wireless communication (depicted in FIG. 8 by the lightning bolt symbols between the client device 825 and the computing system 840, between the client device 825 and network(s) 810, between each user device 805a or 805b and the computing system 840, between each user device 805a or 805b and network(s) 810). System 800 might further comprise license server(s) 865 and corresponding database(s) 870.

In operation, client device 825, on which first software or licensed software 835 is executed or run, might receive a request by user 850 to use a requested service using the licensed software 835, in some examples, the licensed software 835 might be software that performs operations on the client device 825, without operating or controlling any external hardware or equipment. Alternatively, the licensed software 835 might be software for operating or controlling equipment 830, which might include, without limitation, an atomic absorption ("AA") system, a capillary electrophoresis ("CE") system, a dissolution system, an optical emission spectrometry ("OES") system, an inductively coupled plasma ("IC") OES system, a gas chromatography ("GC") system, a GC mass spectrometry ("MS") system, a gel permeation chromatography ("GPC") system, a mass spectrometer, an ICP-MS system, an infrared spectroscopy system, a Fourier Transform infrared ("FT-IR") spectroscopy system, a liquid chromatography ("LC") system, a LC-MS system, a microfluidics system, a sample preparation ("SP") system, a supercritical fluid chromatography ("SFC") system, an ultraviolet-visible ("UV-Vis") spectrophotometer, or other laboratory instrumentation, and/or the like.

In response to receiving the request, the client device 825 might initiate authentication protocols of the licensed software 835 that cause generation of a unique identifier associated with at least one of the requested service or the licensed software 835 and to present a prompt to the user 850 to request an unlock code using the generated unique identifier. According to some examples, the unique identifier might be encoded, in an example, using one of a Base16 encoding scheme, a Base32 encoding scheme, a Base36 encoding scheme, a Base58 encoding scheme, or a Base64 encoding scheme, and/or the like. Base32 encoding, Base58 encoding, and the like use character sets that are selected to avoid similar-looking pairs of different symbols.

Computing system 840, server 815a or 815b, remote computing system 855, and/or license server 865 (collectively, "computing system" or the like) might receive a request for the unlock code. In an example, the request for the unlock code might comprise the generated unique identifier, and the generated unique identifier might comprise licensing information. In response to receiving the generated unique identifier, the computing system might determine whether the user should have access to the requested service using the licensed software 835 (which might be stored in corresponding database(s) 845, 820a-820n, or 860, or the like) based at least in part on the licensing information embedded in the generated unique identifier. In an example, such determination might comprise extracting the licensing information embedded in the unique identifier. The computing system might then determine whether the user should have access to the requested service using the licensed software 835, based at least in part on the licensing information and at least one of stored information regarding at least one of the user 850, an entity with which the user is associated, the requested service, or the licensed software 835, and/or the like.

Based on a determination that the user should have access to the requested service using the licensed software 835, the computing system might generate an unlock code associated with the requested service using the licensed software 835 and might deduct cost associated with the licensing information. In an example, the unlock code might be a per-session code for unlocking a single session use of the requested service using the licensed software 835. In an example, the unlock code might comprise embedded data, including, but not limited to, at least one of security-related data, data associated with the generated unique identifier, data regarding type of user, data regarding whether the user is under requirement of payment, session identification data, data regarding type of service requested, or data regarding type of hardware associated with the requested service, and/or the like. In an example, generating the unlock code associated with the requested service using the licensed software 835 might comprise permutating the unique identifier in a predetermined manner and creating a hash-based message authentication code ("HMAC") using a cryptographic hash function comprising a secure hash algorithm ("SHA"). In an example, the secure hash algorithm might include, but is not limited to, one of a SHA-224 algorithm, a SHA-256 algorithm, a SHA-384 algorithm, a SHA-512 algorithm, a SHA-512/224 algorithm, or a SHA-512/256 algorithm, and/or the like. Although S-A is described as a means of creating a hash, the various examples are not so limited, and any suitable hash mechanisms or techniques may be used.

The computing system might send the unlock code to the user. The client device 825 might receive the unlock code. In response to receiving the unlock code, client device 825 might verify the unlock code. In response to the unlock code being verified, client device 825 might unlock the single session use of the requested service using the licensed software 835 to allow the user to access the single session use of the requested service using the licensed software 835.

In some examples, the licensing information might include, without limitation, at least one of data regarding the requested service using the licensed software 835, session data for session use of the requested service, data regarding type of system for providing the requested service, information regarding type of license associated with at least one of the requested service or the licensed software 835, information regarding time that the generated unique identifier was generated, information regarding session information validation, information regarding cost corresponding to the license associated with the at least one of the requested service or the licensed software 835, information regarding conditions associated with the license, information regarding limitations associated with the license, information regarding type of hardware associated with the licensed software 835, information regarding type of hardware associated with the requested service, or information regarding a session use of the requested service, and/or the like. In an example, the type of license might include, but is not limited to, one of a pay per use license, a period subscription license, a right to use (or unlimited use) license, or a free to use license (e.g., a no-charge use license, or the like), and/or the like.

Merely by way of example, presenting the prompt to the user to request an unlock code using the generated unique identifier might comprise presenting two or more options that include, without limitation, displaying the generated unique identifier and a communication device for the user to use or contact and to provide (e.g., by speaking, by typing, by copying and pasting, etc.) the generated unique identifier; displaying a connection mechanism to a collection of information, the connection mechanism (e.g., a link comprising a uniform resource locator ("URL"), or the like) including the generated unique identifier; or displaying a visual code and a prompt for the user to scan the visual code, the visual code containing data associated with the generated unique identifier; and/or the like. In an example, the visual code might include, but is not limited to, one of a bar code or a quick response ("QR") code, and/or the like.

In some examples, receiving the generated unique identifier contained in the received request for the unlock code might include, but is not limited to, one of: receiving and converting, via speech-to-text conversion, the generated unique identifier that is spoken by the user over a telephone; receiving, via text input field, the generated unique identifier that is manually entered by the user or another user via a user interface; receiving, via text input field, the generated unique identifier that is copied and pasted by the user via the user interface; receiving the generated unique identifier as a visual code, an image of which is captured by the user using a camera of a user device (e.g., user device 805a or 805b (similar to user devices 135 and 235 of FIGS. 1 and 2, or the like), or the like); or receiving the generated unique identifier from the client device via network communication when the client device is connected to a communication network (e.g., the Internet or other network); and/or the like. In an example, the image of the visual code, when captured, might trigger one of sending the generated unique identifier to the computing system over a network or accessing a collection of information (e.g., a webpage, website, or web portal, or the like) that allows the user to manually enter the generated unique identifier.

These and other functions of the system 800 (and its components) are described in greater detail above with respect to FIGS. 1-6.

While certain features and aspects have been described with respect to exemplary examples, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various examples are not limited, to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several examples.

Moreover, while the procedures of the methods and processes described herein are described in a particular order for ease of description, unless the context dictates otherwise, various procedures may be reordered, added, and/or omitted in accordance with various examples. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various examples are described with—or without—certain features for ease of description and to illustrate exemplary aspects of those examples, the various components and/or features described herein with respect to a particular example can be substituted, added and/or subtracted from among other described examples, unless the context dictates otherwise. Consequently, although several exemplary examples are described above, it will be appreciated that the invention is intended to cover all modifications and equivalents within the scope of the following claims.

What is claimed is:

1. A method, comprising:
   receiving a request for an unlock code for a requested service using a first software from a user using a client device on which the first software is executed, wherein the request for the unlock code comprises:
   a generated unique identifier associated with the requested service,
   wherein the generated unique identifier comprises licensing information that includes at least one of data regarding the requested service using the first software, session data for session use of the requested service, data regarding type of system for providing the requested service, or information regarding type of license associated with at least one of the requested service or the first software;

in response to receiving the generated unique identifier, extracting the licensing information embedded in the unique identifier, and determining whether the user should have access to the requested service using the first software based at least in part on the licensing information and stored information regarding at least one of the user, an entity with which the user is associated, the requested service, or the first software; and based on a determination that the user should have access to the requested service using the first software, generating an unlock code associated with the requested service using the first software;

deducting cost associated with the licensing information;

sending the unlock code to the user, wherein the unlock code is a per-session code for unlocking a single session use of the requested service using the first software, receiving, decrypting, and authenticating a refund code from the user; and in response to receiving, decrypting, and authenticating the refund code, invalidating, a current single session use of the requested service using the first software, and incrementing a counter indicating a remaining number of credits by a predetermined number of credits per session use for the requested service.

2. The method of claim 1, wherein the licensing information further comprises one or more of information regarding time that the generated unique identifier was generated, information regarding session information validation, information regarding cost corresponding to the license associated with the at least one of the requested service or the first software, information regarding conditions associated with the license, information regarding limitations associated with the license, information regarding type of hardware associated with the first software, information regarding type of hardware associated with the requested service, or information regarding a session use of the requested service, wherein the type of license comprises one of a pay per use license, a period subscription license, a right to use license, or a free to use license.

3. The method of claim 2, wherein the pay per use license comprises a use license based on a purchased or pre-purchased number of credits, wherein the requested service among a plurality of available services costs the predetermined number of credits per session use, wherein the method further comprises:

after generating the unlock code, decrementing the counter that indicates the remaining number of credits among the purchased or pre-purchased number of credits by the predetermined number of credits per session use, the counter being associated with the user or an entity with which the user is associated.

4. The method of claim 3, further comprising:

receiving, decrypting, and authenticating a purchase code from the user, wherein the purchase code corresponds to purchase of one or more additional credits; and in response to receiving, decrypting, and authenticating the purchase code, incrementing, the counter indicating the remaining number of credits by the purchased one or more additional credits.

5. The method of claim 4, wherein at least one of the purchased or pre-purchased number of credits, the remaining number of credits, or the one or more additional credits are assignable to at least one of an entity associated with the pay per use license, an account associated with the entity, or one or more individuals associated with the entity.

6. The method of claim 1, wherein an option to access the refund code is available before the deliverable end to the single session use of the requested service using the first software, wherein said option to access the refund code is inactivated once the deliverable end to the single session use has occurred.

7. The method of claim 1, wherein receiving the generated unique identifier contained in the received request for the unlock code comprises one of: receiving and converting, via speech-to-text conversion, the generated unique identifier that is spoken by the user over a telephone; receiving, via text input field, the generated unique identifier that is manually entered by the user or another user via a user interface; receiving, via text input field, the generated unique identifier that is copied and pasted by the user via the user interface; receiving the generated unique identifier as a visual code, an image of which is captured by the user using a camera of a user device; or receiving the generated unique identifier from the client device via network communication when the client device is connected to a communication network.

8. The method of claim 7, wherein the image of the visual code, when captured, triggers one of sending the generated unique identifier over a network or accessing a collection of information that allows the user to manually enter the generated unique identifier.

9. The method of claim 1, wherein the unlock code comprises embedded data comprising at least one of security-related data, data associated with the generated unique identifier, data regarding type of user, data regarding whether the user is under requirement of payment, session identification data, data regarding type of service requested, or data regarding type of hardware associated with the requested service.

10. The method of claim 1, wherein generating the unlock code associated with the requested service using the first software comprises permutating the generated unique identifier in a predetermined manner and creating a hash-based message authentication code ("HMAC") using a cryptographic hash function comprising a secure hash algorithm ("SHA"), wherein the secure hash algorithm comprises one of a SHA-224 algorithm, a SHA-256 algorithm, a SHA-384 algorithm, a SHA-512 algorithm, a SHA-512/224 algorithm, or a SHA-512/256 algorithm.

11. The method of claim 1, wherein receiving the generated unique identifier contained in the received request for the unlock code comprises receiving the generated unique identifier as a visual code, an image of which is captured by the user using a camera of a user device.

12. The method of claim 1, wherein receiving the generated unique identifier contained in the received request for the unlock code comprises receiving the generated unique identifier from the client device via network communication when the client device is connected to a communication network.

13. An apparatus, comprising:

at least one processor; and a non-transitory computer readable medium communicatively coupled to the at least one processor, the non-transitory computer readable medium having stored thereon computer software comprising a set of instructions that, when executed by the at least one processor, causes the apparatus to:

receive a request for an unlock code for a requested service using a first software from a user using a client device on which the first software is executed, wherein the request for the unlock code comprises a generated unique identifier associated with the requested service, wherein the generated unique identifier comprises licensing information that includes at least one of data regarding the requested service using the first software, session data for session use of the requested service, data regarding type of system for providing the requested service, or information regarding type of license associated with at least one of the requested service or the first software;

in response to receiving the generated unique identifier, extract the licensing information embedded in the unique identifier, and determine whether the user should have access to the requested service using the first software based at least in part on the licensing information and stored information regarding at least one of the user, an entity with which the user is associated, the requested service, or the first software;

based on a determination that the user should have access to the requested service using the first software, generate the unlock code associated with the requested service using the first software;

deduct cost associated with the licensing information; and send the unlock code to the user, wherein the unlock code is a per-session code for unlocking a single session use of the requested service using the first software, receive, decrypt, and authenticate a refund code from the user; and in response to receiving, decrypting, and authenticating the refund code, invalidate, a current single session use of the requested service using the first software, and increment a counter indicating a remaining number of credits by a predetermined number of credits per session use for the requested service.

\* \* \* \* \*